(12) United States Patent
Kumbalimutt et al.

(10) Patent No.: US 6,871,346 B1
(45) Date of Patent: Mar. 22, 2005

(54) BACK-END DECOUPLED MANAGEMENT MODEL AND MANAGEMENT SYSTEM UTILIZING SAME

(75) Inventors: Vishwajith Kumbalimutt, Kirkland, WA (US); Jorg-Thomas Pfenning, Redmond, WA (US); Quentin S. Miller, Issaquah, WA (US); Michel Guittet, Redmond, WA (US); Todd L. Paul, Snohomish, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/502,689

(22) Filed: Feb. 11, 2000

(51) Int. Cl.[7] .............................. G06F 9/44; G06F 9/46; G06F 7/00
(52) U.S. Cl. ....................... 718/104; 718/100; 707/100; 717/120
(58) Field of Search ................................ 717/106–109, 717/114–116, 120, 121; 718/100, 104; 707/3, 9, 10, 100, 102; 704/100, 104

(56) References Cited

U.S. PATENT DOCUMENTS

| | | | | |
|---|---|---|---|---|
| 5,526,415 A | * | 6/1996 | Wakamoto | 379/230 |
| 5,764,955 A | * | 6/1998 | Doolan | 709/223 |
| 5,857,197 A | * | 1/1999 | Mullins | 707/103 R |
| 6,003,075 A | * | 12/1999 | Arendt et al. | 709/221 |

(List continued on next page.)

OTHER PUBLICATIONS

"Dynamic Host Configuration Protocol for Microsoft Windows 2000", Microsoft Corporation, Mar. 1999.
"WMI Overview", Microsoft Corporation, May 28, 1999.
"WBEM and WMI", *MSDN Online*, Microsoft Corporation, 1999. Available from http://msdn.microsoft.com/developer/sdk/wmisdk/default.asp. [Accessed Oct. 12, 1999].

(List continued on next page.)

*Primary Examiner*—Meng-Al T. An
*Assistant Examiner*—Syed J Ali
(74) *Attorney, Agent, or Firm*—Microsoft Corp.

(57) ABSTRACT

Presented is a web-based enterprise management compliant management framework whose back end components are decoupled from the various user interfaces available for accessing the management system. In the Windows environment, the management system of the instant invention is also compliant with the Windows management instrumentation (WMI) requirements. This management system includes WMI providers which implement standard interfaces which decouple all semantic and syntactic checks from the user interface and which provide common error strings, help, etc. to a user regardless of the user interface being used. The providers of the management system of the instant invention store and access data in the active directory. As such, these providers present a customizable user interface which may be based on a user's expertise level and which may be dynamically localized to the user's preferred language. Transaction support is also provided which prevents multiple users from changing the same attributes at the same time through different user interfaces.

24 Claims, 6 Drawing Sheets

U.S. PATENT DOCUMENTS

| | | | | |
|---|---|---|---|---|
| 6,076,091 A | * | 6/2000 | Fohn et al. | 707/102 |
| 6,243,815 B1 | * | 6/2001 | Antur et al. | 713/201 |
| 6,288,716 B1 | * | 9/2001 | Humpleman et al. | 345/733 |
| 6,317,748 B1 | * | 11/2001 | Menzies et al. | 707/103 X |
| 6,367,034 B1 | * | 4/2002 | Novik et al. | 714/39 |
| 6,397,245 B1 | * | 5/2002 | Johnson et al. | 709/203 |
| 6,427,168 B1 | * | 7/2002 | McCollum | 709/224 |
| 6,487,552 B1 | * | 11/2002 | Lei et al. | 707/4 |
| 6,493,688 B1 | * | 12/2002 | Das et al. | 706/20 |
| 6,493,719 B1 | * | 12/2002 | Booth et al. | 707/103 X |
| 6,574,635 B2 | * | 6/2003 | Stauber et al. | 707/103 R |

OTHER PUBLICATIONS

"Common Information Model (CIM) Core Model Whitepaper Version 1", *Distributed Management Task Force,* Aug. 1998. Available from http://dmtf.org/spec/cim_core. [Accessed Oct. 12, 1999].

"Internet Information Services 5.0 Technical Overview", Microsoft Corporation, 1999.

"Microsoft Management Console: Overview", Microsoft Corporation, Dec. 15, 1999.

"Windows Management Instrumentation: Background and Overview", Microsoft Corporation, Dec. 15, 1999. Available from http://www.microsoft.com/windows2000management/wmioverview.asp.

"Active Directory Service Interfaces Overview", Microsoft Corporation, Jun. 23, 1999. Available from http://www.microsoft.com/windows/server/techinical/directory/adsilinks.asp. [Accessed Oct. 12, 1999].

"Microsoft Active Directory Service Interfaces: ADSI Open Interfaces for Managing and Using Directory Services", Microsoft Corporation, 1999.

* cited by examiner

BACK-END DECOUPLED MANAGEMENT MODEL AND MANAGEMENT SYSTEM UTILIZING SAME

This invention relates generally to enterprise management models and, more particularly, relates to a Management model that enables a consistent system behavior regardless of what type of client is used to manage the system.

BACKGROUND OF THE INVENTION

Modern corporations and other enterprises are utilizing more and more software based "solutions" in their day to day operations. Computer networks, telephony systems, Internet access, e-mail, personnel record keeping, billing and payroll, etc. all are nearly completely run through software based systems. With this increased software content, corporations and other enterprises have a need to monitor the performance and status of elements of their computer networks to prevent data loss and to maximize resource efficiency. Further, these corporations and enterprises have a need to manage the individual resources, functions, users, etc. which make up these solutions, which determine the operation of these solutions, and who use and are tracked by these solutions.

Currently, many of these enterprise software solutions require that the management thereof be performed through the programs themselves. To support such enterprise system management, the assignee of the instant application developed a management framework called Microsoft® Management Console (MMC). MMC is an extensible user interface that provides an environment for running systems management applications structured as components called snap-ins. MMC is a Windows®-based multiple document interface (MDI) application that makes extensive use of Microsoft's COM (Component Object Model) technology. Both OEMs (Original Equipment Manufacturers) and ISVs (Independent Software Vendors) can extend the console by writing MMC snap-ins, which are responsible for performing management tasks. MMC serves as a host for snap-in-defined user interfaces, but does not limit what the snap-ins can do or how they communicate with the administered services.

MMC does not replace existing enterprise management applications, such as Hewlett-Packard OpenView™ or the IBM Tivoli Management Environment™. Instead, it extends these tools by allowing them to interact with or be packaged as snap-ins that can be accessed from the MMC user interface. For example, an enterprise management application could detect a database event and send an alarm to a snap-in. A system administrator would then see the event in an MMC session and take appropriate action. MMC interacts with snap-ins using several MMC-defined interfaces under the COM standard.

Specifically, snap-ins are implemented as COM in-process (in-proc) server dynamic link libraries (DLLs) supporting one or more of these interfaces and registering themselves appropriately in the MMC registry area. MMC gains access to the snap-in by obtaining a pointer to one of its interfaces. With this pointer, MMC can use the snap-in without understanding its implementation and can depend on it to behave in a consistent manner all the time. COM interfaces also provide a way to extend the functionality of the MMC user interface without dictating how each snap-in performs its particular tasks. Implementation is entirely up to the snap-in. In other words, MMC interfaces allow snap-ins to share a common hosting environment and provide cross-application integration. By using this approach, both software OEMs and ISVs can write administrative applications that are hosted by MMC. This is also true for developing management tools to run in MMC and writing applications to be managed by MMC administrative tools. The design of MMC allows developers to spend less time building and rebuilding windowing frameworks for tools and more time on the tasks associated with building real management functionality.

As will be recognized, the management console itself does not supply any management behavior, but instead provides a common environment for these software modules commonly called "snap-ins.". The snap-ins define the actual management behavior available to an administrator through the management console. The management console organizes and coordinates the snap-ins and provides an integrated user interface through which the administrator can invoke the snap-ins to provide their respective management behavior. For example, the management console may be used to show the computers in a network, or the users of a specified server in a distributed system.

Typically, the management console includes a user interface for selecting a management behavior provided by the snap-ins, and a node manager to interact with snap-ins and to coordinate the operations of the snap-ins through specified programming interfaces. The snap-ins to be used with the management console are registered with a registry of the operating system, and graphic interface items corresponding to the snap-ins may be placed in the user interface window of the management console. When the user selects a management behavior through the interface window, the node manager invokes the corresponding snap-in to provide the selected management behavior.

As an example of this management, attention is now directed to FIG. 2 which illustrates a management framework including MMC. As may be seen from this FIG. 2, MMC 60 is being utilized to manage a dynamic host configuration protocol (DHCP) server 62 which, as will be recognized by those skilled in the art, is a network service. MMC 60 utilizes a DHCP snap in 64 to perform its management functions as described above in coordination with the DHCP management application program interface (API) 66. As will also be made clear from reference to this FIG. 2, the management of the DHCP server 62 may also be accomplished through the use of NetShell 68 to provide a command line interface management option. NetShell is also known is Netsh exe and is a tool an administrator can use to configure and monitor Windows 2000-based computers at a command prompt. As will be recognized by one skilled in the art, NetShell 68 implement helper functions 70 which through the management API 66 allows command line interface management of the DHCP server 62. With the Netsh exe tool an, administrator can direct the context command he or she enters to the appropriate helper, and the helper then carries out the command. A helper is a Dynamic Link Library (.dll) file that extend, the functionality of the Netsh exe tool by providing configuration monitoring and, support for one or more services, utilities or protocols. The helper may also be used to extend other helpers.

While this framework performs quite well, certain aspects thereof are available for improvement. Specifically, each of these components, MMC 60 for Windows based management or NetShell 68 for command line interfaces, implements its own syntax and semantic checks for the various management tasks which are performed therethrough. This results in a significant amount of redundancy due to the fact that the same work has to be done for both MMC 60 and NetShell 68. This can also lead to serious inconsistencies if any change is done in one place and not reflected in the other. The result is an increased cost of maintenance of the enterprises and an overall increase in the cost of ownership because one needs to ensure that any time a change is made through one interface, the code for the other interface is also updated with the new change Specifically, for each particular attribute, range, value, etc. change through either of these interfaces a system administrator must be concerned with the effect that such change has on any other attribute which may be managed differently through one interface as opposed to the other. Further, since NetShell 68 and MMC 60 are disparate pieces of code, each present a different user experience when performing management tasks therethrough. These different user experiences include possibly disparate error messages and steps through which the management is performed. This different user experience also includes the amount and type of help information which may or may not be provided for the various tasks performed therethrough. An additional problem with the management framework illustrated in FIG. 2 results from the fact that the interfaces between the management API 66 and the helper 70 and snap in 64 are C interfaces. As a result, there is no portability of management control through this architecture, prohibiting the management from another machine.

Currently, the computer industry is developing a concept of Web-Based Enterprise Management ("WBEM") to overcome some of the problems existing with the prior architecture. WBEM is an industry initiative to develop a standardized, nonproprietary means for accessing and sharing management information in an enterprise network. The WBEM initiative is intended to solve the problem of collecting end-to-end management and diagnostic data in enterprise networks that may include hardware from multiple vendors, numerous protocols and operating systems, and a legion of distributed applications The WBEM industry-wide initiative is to develop a standardized technology for accessing management information in enterprise environments to help companies lower their total cost of ownership of these enterprise systems.

Microsoft has developed WMI (Windows Management Instrumentation) so that developers may build applications capable of accessing all of the management information available on Microsoft Windows platforms. This includes applications that access machine resources such as system memory, available hard disk space, and printer installations, that inventory current applications installed on a client, and that administer an application on a remote application server, in process events such as simple network management protocol (SNMP) traps, and events recorded in the windows NT event log. The WMI technology enables systems, applications, networks, and other managed components to be represented using the Common Information Model (CIM), as standardized by the Desktop Management Task Force (DMTF). CIM can model anything in the managed environment regardless of data source location.

Typical sources for management information include databases and the underlying system. For example, a database may be queried by a management application, or a system call may be made to determine the state of some device, e.g., the free space of a disk. Alternatively, some management applications interface directly with instrumentation that can pull information from device drivers or other software components. For example, a management application may communicate with remote disk drive software to determine how much free space remains on a network drive. As can be readily appreciated, the wide variety of management applications and resources, protocols, formats, frameworks, and so on made it difficult and complicated for management applications and the users thereof to obtain the desired information.

The founding companies of the WBEM initiative developed a prototype set of environment-independent specifications for how to describe and access any type of management instrumentation, including existing standards such as Simple Network Management Protocol and Desktop Management Interface. As described above, a core component of the specification is a standard data description mechanism known as the Common Information Model ("CIM"). The CIM specification describes the modeling language, naming, and mapping techniques used to collect and transfer information from data providers and other management models. The Windows Management Instrumentation ("WMI") system is compliant with CIM and the WBEM initiative. A simplified block diagram of WMI's Architecture is illustrated in FIG. 3.

A significant improvement for accessing and returning management information is the result of the use in WMI 72 of a common information model object manager (CIMOM) 74 provided to isolate management applications 76, 78, 80, 82 from the various sources of management information, while providing a single, uniform way to access the information. This CIMOM 74 is decribed in detail in a co-pending application entitled "Object Manager for Common Information Model" filed Feb. 6, 1998 as application Ser. No. 09/020,146, now abandoned, and continuation filed February 13, 2002 as application Ser. No. 10/076,166. With the CIMOM 74, each management application 76, 78, 80, 82 submits queries to the CIMOM 74 in a uniform way. The CIMOM 74 then communicates with one or more sources of the information, known as providers 84, to return an appropriate reply. The CIMOM 74 is intelligent in that it can decompose queries into requests from multiple providers 84 and synthesize the results into a single response, filter excess information, work with the capabilities of the providers, and so forth.

In a common information model (CIM) installation, a process acting in the role of a client (e.g. 80) makes management requests, while a process acting as a server, i.e., a CIM object manager, or the CIMOM 74, satisfies each request via one or more providers 84 and returns an appropriate response via uniformly rendered managed objects. The client process (e.g., a management application 80) communicates management information requests through a proxy 72 to the CIMOM 74. At least part of the communication is preferably via COM (Component Object Model) and/or DCOM (Distributed Component Object Model), i.e., by invoking methods of objects in the CIMOM server 74 over an underlying protocol such as TCP. Additionally, the client process 80 may communicate with the CIMOM 74 using the HyperMedia Management Protocol (HMMP). HMMP provides management services across platform boundaries by defining a common network access model, a common schema, and a common security model.

By way of example of how management information is exchanged in WMI 72, the client process 80 starts a request, which is appropriately packaged up by the proxy 72. The request is received by the CIMOM 74, which is a component on a server that implements a large subset of the communication protocol, and which switches roles so as to act as a proxy on behalf of client process requests. As part of its function, the CIMOM 74 passes the client process requests to one or more appropriate servers known as object providers 84 (or simply providers). Providers 84 are the sources of management information, and typically obtain their information directly from a system resource such as a hardware device or database, although a provider 84 may obtain some of its provided information from another provider, e.g., via the CIMOM 74. By way of example, one type of provider 84 may be implemented in a software driver or the like supplied by a vendor to accompany a hardware device such as a disk drive.

In order to service a request, the CIMOM 74 accesses a CIM repository 86 (database) in order to determine which object provider or providers to contact (if any). More particularly, when the client process 80 sends a request to the CIMOM 74, the client process 80 will access the CIM repository 86, which may have the information therein if static, and/or will provide the information necessary for locating the appropriate provider 84 or providers which can satisfy the request. Thus, the CIMOM 74 will either directly satisfy a request or in essence become a client process itself and forward the request to an appropriate provider 84.

Through the CIMOM 74, client processes 80 are relieved of the burden of locating and directly managing a multitude of devices on the network. Instead, the CIMOM 74 hides the management complexity by distributing the request to the appropriate providers 84. The providers gather the necessary data from the devices using vendor or protocol-specific mechanisms such as DMI, SNMP, CMIP or a proprietary mechanism, and return the data to the requesting the CIMOM 74.

Providers 84 are components (e.g., dynamic link libraries, or DLLs) which are essentially more primitive in nature than the CIMOM 74 itself. As a result, in order for the CIMOM 74 to present uniform capabilities to the client process 80, the CIMOM 74 may simulate any operations not directly supported by a provider 84, by executing more and more primitive requests until a request is understood by the provider 84. The CIMOM 74 then synthesizes the results and returns them to the client process 80 as though the provider 84 or providers had been capable of the original complex request submitted by the client process 80. The CIMOM 74 is capable of retrieving both the static and dynamic information from various sources including the CIM database 80 and/or appropriate providers 84, and returning the object instance to the client process 80 (application).

The CIMOM 74 is capable of receiving potentially high level SQL queries, decomposing those queries as necessary, and communicating with a variety of sources, possibly in a series of very primitive operations, to produce a result. The operations are transparent to the client process 80, as the result is returned in the same manner regardless of the sources that supplied the information. For example, a query such as—select*from LogicalDisk where FreeSpace<20000000—intends to have returned only instances that meet the less than twenty megabyte criteria, and not all instances of the LogicalDisk class. If the provider 84 or providers of this information are unable to limit their retrieval based on these criteria, the CIMOM 74 provides the correct result set by a post-retrieval filtering operation. The CIM object manager 74 thus performs operations that complement the capabilities of providers in order to uniformly render managed objects to management applications 80. Because some providers have substantially more capabilities than other providers, the CIMOM 74 attempts to operate each provider with its maximum capabilities, lowering its level for requesting information from a provider until the provider can satisfy the request, e.g., by reducing the complexity of a query for that provider.

Unfortunately, while this management framework provides a substantially improved model over its predecessors, it still includes areas that may be improved. Specifically, while the lack of portability of the prior management model has been overcome, each of the methods of providing user interface to the management system still performs their own syntax and semantic checks. As discussed above, this results in redundancy between each of the various user interfaces, and may lead to inconsistencies as variables are changed through one interface, and may not be reflected in others. Additionally, as with the prior management model, the user experience may differ significantly upon accessing the management system through each of the different user interfaces as they each generate their own help strings, etc. Therefore a need exists to provide a management framework which eliminates the redundancy and inconsistencies which may result from the current management framework provided by the WBEM management systems, but which, at the same time, utilizes the basic WBEM management system framework as a basis for the system. There further exists a need in the art for a WBEM based management system which allows for utilization of various user interfaces and which is extensible to support new user interfaces as they become available, while at the same time providing a consistent user experience.

SUMMARY OF THE INVENTION

The inventive concepts disclosed in this application involve a Management Model which provides the definition of a standard set of interfaces to be implemented in the WMI providers that can be accessed by different types of clients, such as browsers, MMC, Command Line Interface tools like Netshell, etc. The definition of a standard set of interfaces ensures that the behavior of the management system is consistent across different types of clients since the knowledge of the syntax and semantics of the various attributes of the system resides on the server and not in the client programs. Such diverse user entry points into the management system are further enhanced by dynamic localization which determines the proper language of the text to be displayed to the administrator at run time. A Directory Service (for example Microsoft's Active Directory) will be used as the storage mechanism for the management data entered by the system administrator in this management model.

The Management Model of the instant invention solves the above described problems by making the back-end components decoupled from the user interface so that no matter which user interface is used to institute changes in the enterprise, the same consistent behavior results. All syntax and semantic checks are performed at this common level in one place to eliminate the redundancy of the prior system by not requiring each user interface component to implement the same functionality. The Management Providers of the instant invention are provided below the CIM Object Manager (CIMOM). These Providers include methods to set and get attribute values, get localized help strings for attributes, get default values for an attribute, get valid values for an attribute, save a resource object to a persistent store, restore an object from the persistent store, etc. The management system of the instant invention also utilizes schema to represent the management data. This schema will be based on the CIM developed by DMTF, and may include some classes which are derived from the X.500 schema classes. However, new schema have also been designed for the exemplary implementation of the Management Model of the instant invention in an enterprise telephony system.

Dynamic localization is also performed at run time so that the proper language is displayed to the system administrator through the user interface.

An exemplary implementation of the management model of the instant invention is described with regard to its management of an enterprise telephony communications server. In this exemplary environment the components that the management system will manage include users, extensions, dial plans, trunks, trunk groups, supplementary services, call logging, call routing, RAS server, router, DHCP server, DNS server, proxy server, etc. While descriptions of each of these components is beyond the scope of this document, it is noted that while the Active Directory schema has a "user" class that represents a user in the Windows environment, in the telephony domain additional attributes will need to be added to the user class, and have necessitated the development of an auxiliary class "telephony user" which is an extension to the user class.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
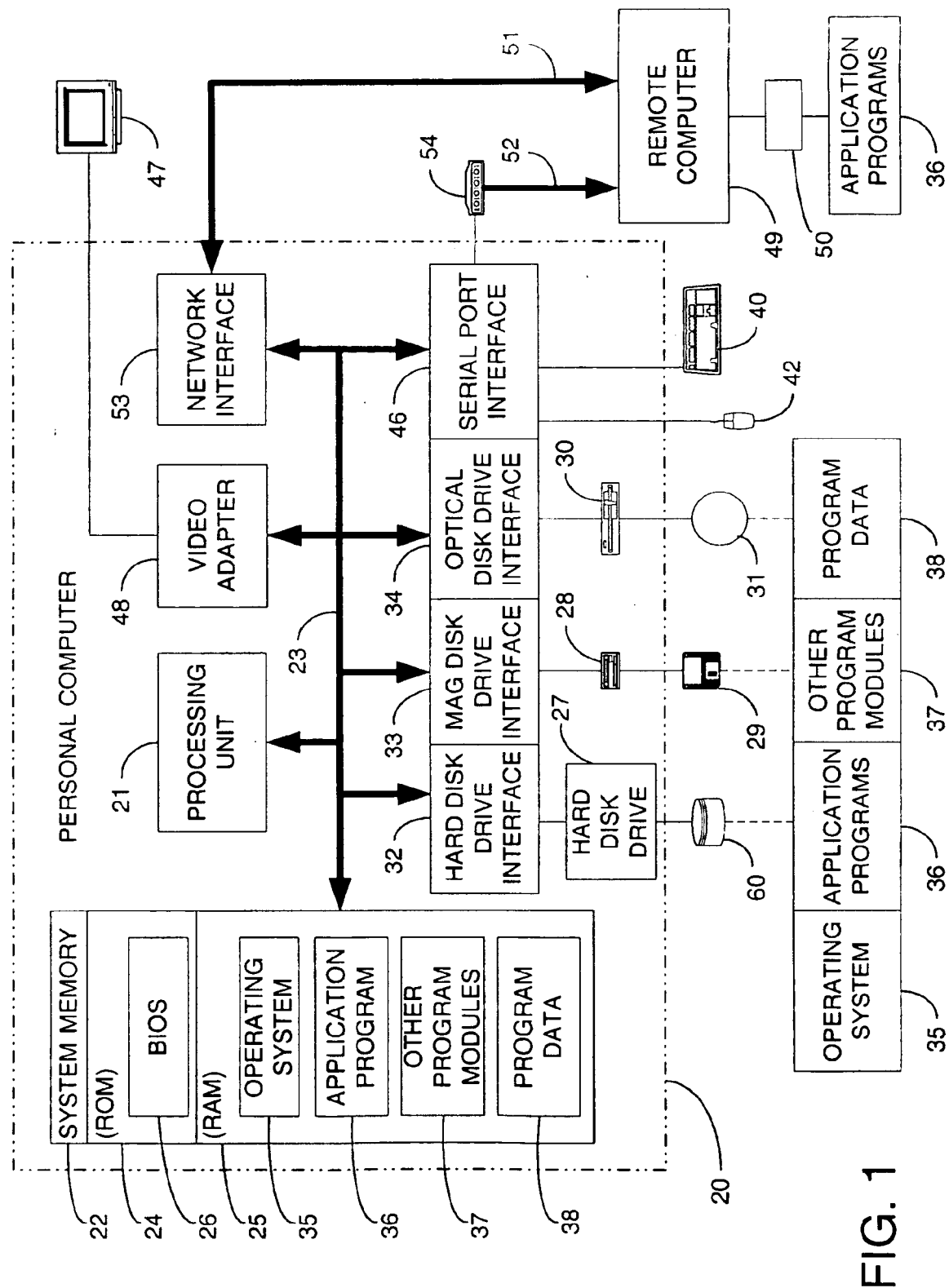
FIG. 1 is a block diagram generally illustrating an exemplary computer system on which the present invention resides.
Figure 2:
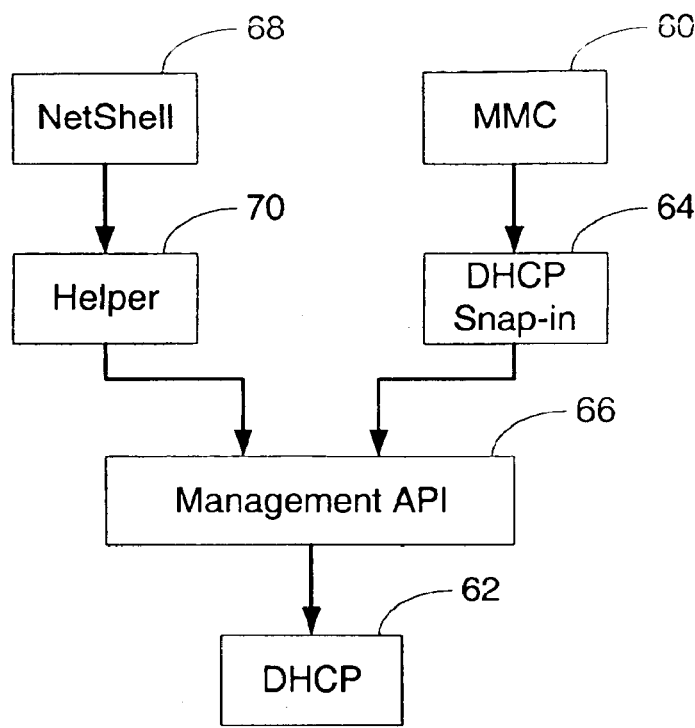
FIG. 2 is a simplified block diagram of a prior art management framework.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide, computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 4:
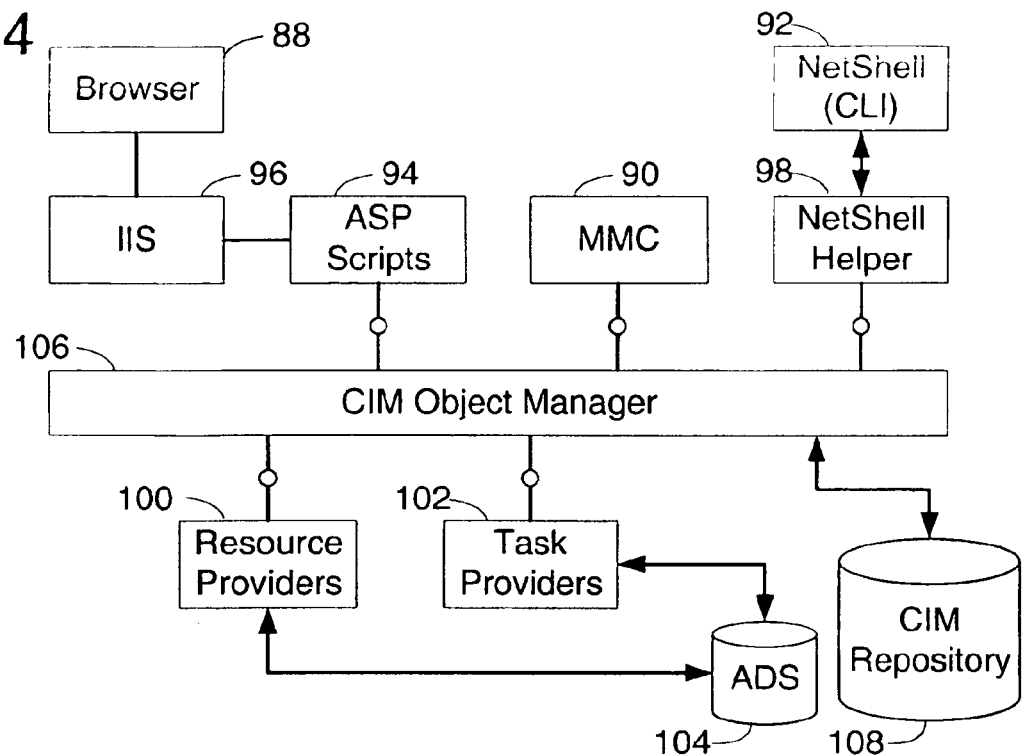
FIG. 4 is a simplified block diagram of the management framework of the instant invention.

The management framework of an enterprise's telephony system in accordance with the instant invention includes several elements that enable an administrator to manage an enterprise system in a way compliant with WBEM. To provide a context to discuss the management system of the instant invention, an exemplary implementation of this system addressed to manage an enterprise's telephony system will be discussed hereinbelow, recognizing that this exemplary embodiment is presented by way of example, and not by way of limitation. These elements include various user interface components, such as a Web based user interface (UI) 88, MMC 90, CLI 92, etc. illustrated in FIG. 4. This Web UI 88 is based on Active Server Pages Scripts (ASP) 94 and Internet Information Server (IIS) 96 and provides a simple, easy to use console. It is also extensible to allow the original equipment manufacturers (OEMs) and independent software vendors (ISVs) to plug-in their components and have them managed using this framework. The Web UI 98 is also customizable to a limited extent to allow "branding." The Web UI 98 also allows remote access to management services using remote access service (RAS) services. Additionally, a Command Line Interface (CLI) 92 based on NetShell (discussed further below) is also included in the system of the instant invention. This interface is useful for remote access by a system administrator using Telnet.

Most of the management services available in the Web UI 88 are available under the CLI 92 also. NetShell is also extensible by implementing helpers 98, which provide additional functionality.

Figure 3:
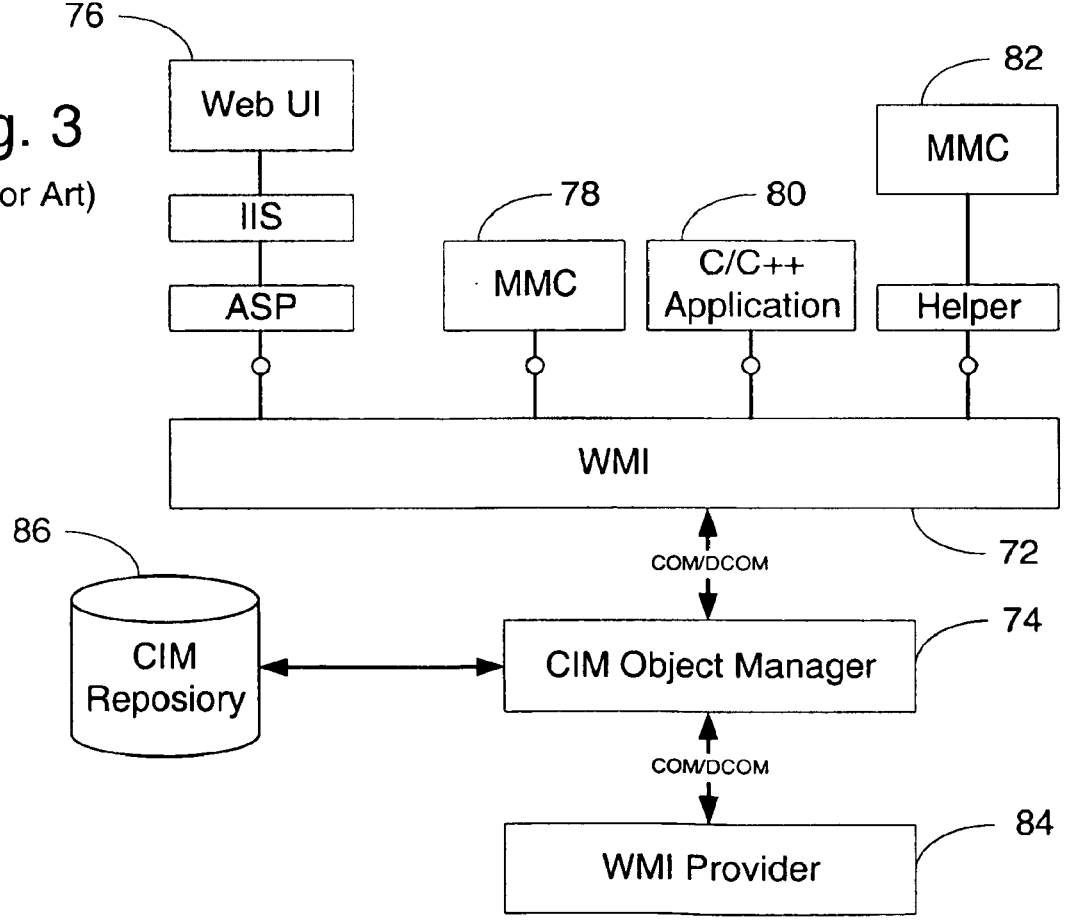
FIG. 3 is a simplified block diagram of the Windows Management Instrumentation architecture.

In addition to the user interface (UI) components, the management framework of the instant invention also includes WMI resource providers 100 and task providers 102. These providers accomplish most of the work in the management framework, and are Windows Management Instrumentation (WMI) providers implemented as Component Object Model (COM) servers. In the system of the instant invention, unlike prior WMI providers 84 (see FIG. 3), these elements perform syntactic and semantic checks on the data being supplied, allow enumeration of available methods and attributes, provide interfaces to Set Attribute and Get Attribute values, provide methods to perform management tasks, pros ide help for attributes and method usage, and store and retrieve management data into a Directory Service (for example Microsoft's Active Directory Services (ADS) 104).

A third category of elements in the management framework of the instant invention is the schema used to represent the management data. These schema are based on the Common Information Model (CIM) standardized by the Desktop Management Task Force (DMTF) Some of the schema classes are derived from the X.500 schema classes.

The fourth category of elements in the management framework of the instant invention is the storage element used to store the management data. A Directory Service (for example, Microsoft's Active Directory Services (ADS) 104) is used for this purpose. As will be recognized by one skilled in the art, ADS 104 is reliable, replicable, secure and distributed. Also, ADS 104 provides a rich set of COM interfaces called Active Directory Services Interfaces (ADSI) that can be used to access the data. ADSI is described in detail in a co-pending application entitled "Directory Service Interface Extensions" fled on Sep. 1, 1991 as application Ser. No. 09/387,927.

The management framework of the instant invention, and in its exemplary implementation for an enterprise's telephony system, is based on the Web Based Enterprise Management (WBEM) architecture, and preferably on the WMI framework. As will be recognized by one skilled in the art, and as discussed above, WBEM is an initiative of the Desktop Management Task Force (DMTF) of which the assignee of the instant application is a part. The Common Information Model (CIM) is an industry standard extensible, object-oriented schema for managing systems, networks, applications, databases, and devices. WMI includes the CIM Object Manager (CIMOM) 106 and some standard WMI providers including Win32, SNMP, Registry, EventLog, etc. It is noted that in this simplified architectural schematic of FIG. 4 that the blocks labeled WMI 72 and CIMOM 74 have been combined for purposes of clarity into the block 106 labeled CIM object manager.

In any system to be managed there are typically two kinds of management data, static data and dynamic data. As its name implies, static data does not change regularly. For this type of data, the CIM repository 108 can be used to store this static data. However, dynamic data must be generated on demand because it is frequently changing. In management framework of the instant invention, a Directory Service (for example Microsoft's Active Directory Services (ADS) 104) is used as the data storage and update mechanism. The WMI providers 100, 102 which use ADSI will handle the data retrieval.

As may be understood from the foregoing, providers are WBEM components that supply WMI with data from managed objects, that handle requests on behalf of management applications, and that generate notifications of events. The management data is represented as managed objects defined in the Managed Object Format (MOF) language. These providers 100, 102 are COM servers that implement a set of interfaces that will be invoked by the CIMOM 106 on behalf of the client applications. There are two types of providers, push and pull providers. Push providers manage data that does not change frequently. They use the WMI and CIM repository 108 extensively. They initialize the data once at initialization time, after which WMI handles data retrieval and event notifications when any change in data occurs. Pull providers are more complex and manage data that changes frequently. As such these pull providers implement their own data retrieval and event notification mechanisms. In a telephony system management scenario, all providers are pull providers. As is typical and recognized by one skilled in the art, the client applications can access the management data using the COM interfaces supplied by CIMOM 106. These applications can be C/C++ applications or script-based applications using VBScript, Jscript, etc.

Utilizing the framework of the instant invention to manage an element of the enterprise system requires that a schema for the managed element be defined. To establish this definition, the attributes of the managed element must be identified. Further, the tasks associated with this element must also be identified. A base class from the CIM schema that has the general characteristics of this element must be determined so that the class for this managed element may be derived from this base class. This derived class may then be added to the ADS schema. Once the schema has been defined, resource 100 and task 102 providers for this element must then be implemented. The Web Elements that will add links to the element in the Web UI 88 framework must also be defined, and the ASP scripts 94 that will implement the resource and tasks associated with the element must be implemented. These scripts must then be localized to the languages that need to be supported. Finally, the commands in the NetShell helper 98 must be implemented to get the CLI access 92. These steps will be discussed in greater detail below.

While it is possible to have a separate management console to perform the enterprise management as discussed above, the management system of the instant invention dispenses with this need and allows "headless" management of an enterprise system. As such, the management framework of the instant invention allows management to be accomplished from a remote machine through one of the above-described interfaces.

As discussed briefly above, the managed elements may include management resources and management tasks. A management resource can be defined as a hardware or software component that needs to be configured, administered, and whose status is of interest to the system administrator or to a privileged user of the system. These resources are modeled using WMI classes and instances. The classes represent a particular type of resource whereas an instance represents an actual resource. Resource providers 100 are the components that act as Object Factories (OF) for these managed resources. These providers are a combination of the WMI Class, Instance, and Method providers. As such, these providers give the Class definitions and generate instances for these WMI classes. They also provide methods that are needed to manage these Resources. Resource management can include, but is not limited to, creating a resource, modifying the properties of an existing resource, retrieving information on an existing resource, and deleting a resource. Managed resources in the exemplary enterprise telephony system can include users, extensions, trunks, route rules, RAS server, DNS server, DHCP server, etc. These resources include both voice and data components, and need to be managed in a consistent manner.

The management tasks can be defined as software components that provide a specialized functionality to execute certain management related operations. These operations will usually result in some kind of interaction with management components, and are modeled using WMI methods. Task providers 102 are the components that implement the methods for the management tasks, and are WMI method providers. Examples of the management tasks in an exemplary enterprise telephony system include adding a user, adding a route rule, configuring an extension, and enabling RAS usage for a user group. These tasks can be used to implement certain management jobs that are frequently done. In terms of UI components, tasks can be implemented as Wizards that take the user through the various steps of completing the operation.

This framework provides an extensible UI that will allow changes according to the needs of the OEM to add "branding" and other unique look and feel aspects. Further, this framework allows the presentation and functionality to be decoupled. This allows the UI to be changed without the need to change the back end components. While the UI may be changed at a user's desire, the system of the instant invention defines initially a standard layout that is extensible and at the same time gives a homogeneous look and feel to the interface regardless of any components added to the interface. The layout 110 is divided into four panes 112, 114, 116, 118 and uses HTML-frames for this effect as illustrated in FIG. 5.

Figure 5:
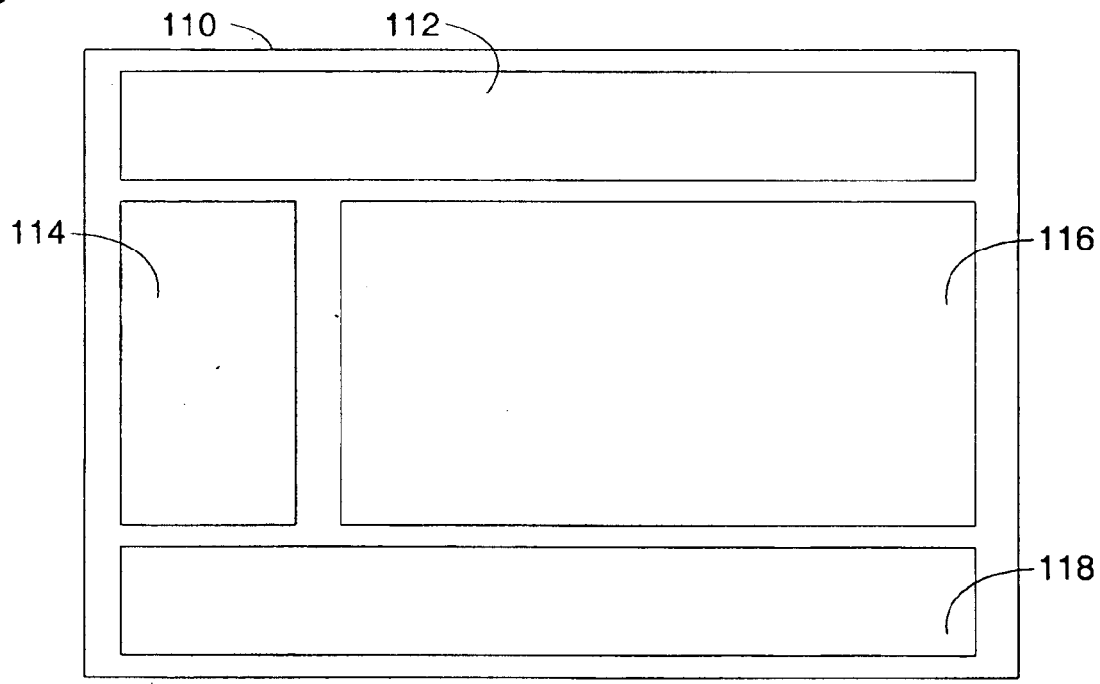
FIG. 5 is a simplified frame layout diagram illustrating an exemplary embodiment of a web UI of the instant invention.
Figure 6:
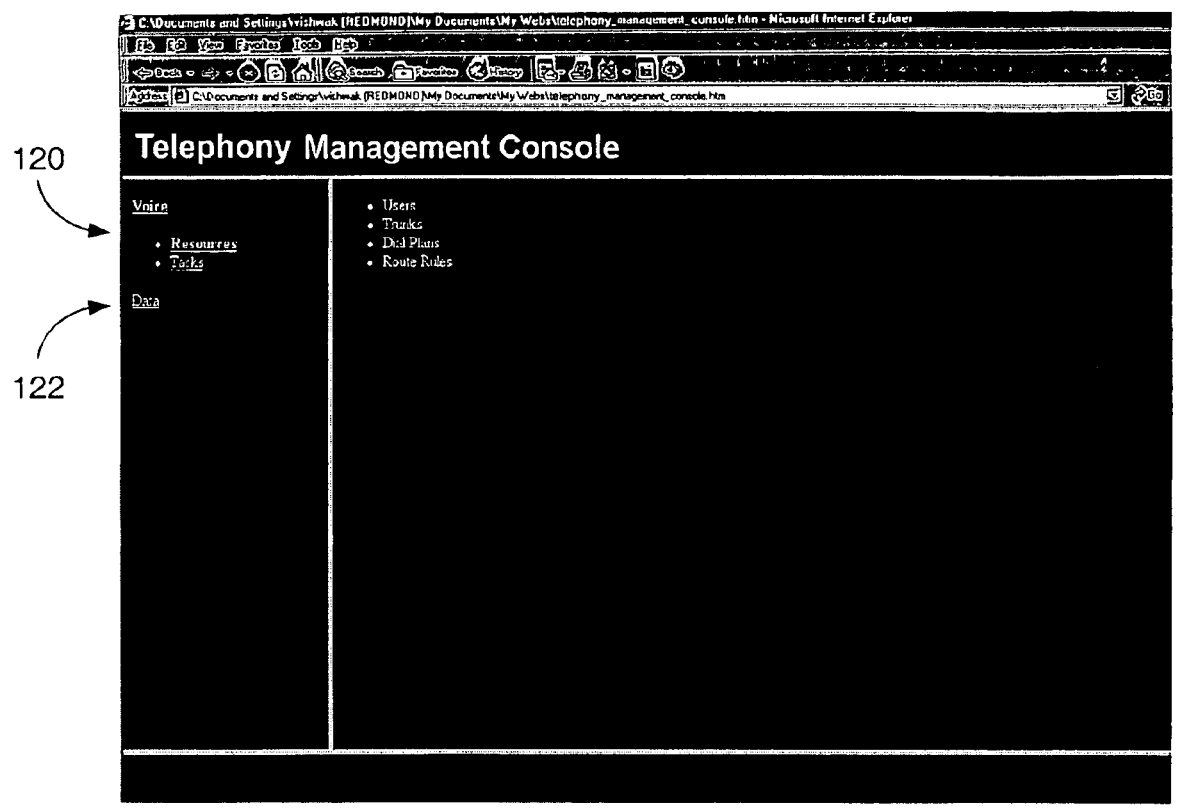
FIG. 6 is an exemplary web UI generated in accordance with the teachings of the instant invention.

As may be seen from this FIG. 5, the four panes include, first, a title pane 112. This pane 112 displays the title of the current subject matter. At startup, this frame 112 could display "Telephony System Management Console." Once the user selects a particular Resource/Service/Task, then the title can change to reflect the current selection. For example, if the profile of user "John Smith" is being edited, then the title can be changed to "Telephony System Management Console—User profile for John Smith." The second pane is the index pane 114. This pane shows a list of elements that are available on the management console. This list is hierarchical and is presented in a hierarchical manner in an Explorer®-like interface to reflect containment. The exemplary telephony system of the instant invention provides both Voice and Data Services as illustrated in FIG. 6. As such, the index will show these two main items of management, "Voice" 120 and "Data" 122. When the user selects one of these links, a list of items that are contained within the selected item is shown. When a particular item is chosen, then the link is highlighted to indicate the Active Index Item (AII). For example, if the "Services" item is chosen under the "Voice" item, then both these links are highlighted. When either "Voice" or "Data" is selected, then a list of items is shown which includes Resources and Tasks. These reflect the management resources, services and tasks respectively as shown in FIG. 7.

Returning to FIG. 5, the third pane is the contents pane 1116. This pane 116 shows data related to the AII, and will be empty if the index item chosen results in expanding the index tree and doesn't actually have any related data. For example, if the item "Voice" is chosen, then it results in a list of contained indices dropping down, but the Contents pane remains empty. If Resources under Voice is chosen as illustrated in FIG. 6, then a list of resources is displayed in the Contents pane. The fourth pane is the messages pane 118. This pane 118 is dedicated for displaying any messages for the system administrator. These messages can include alarms indicating hardware related faults or services that have stopped responding, etc. As an example, if one of the core server components failed, then a message to that effect can be displayed on this pane 118. Also, any actions required to correct the problem can be indicated here as well.

Figure 7:
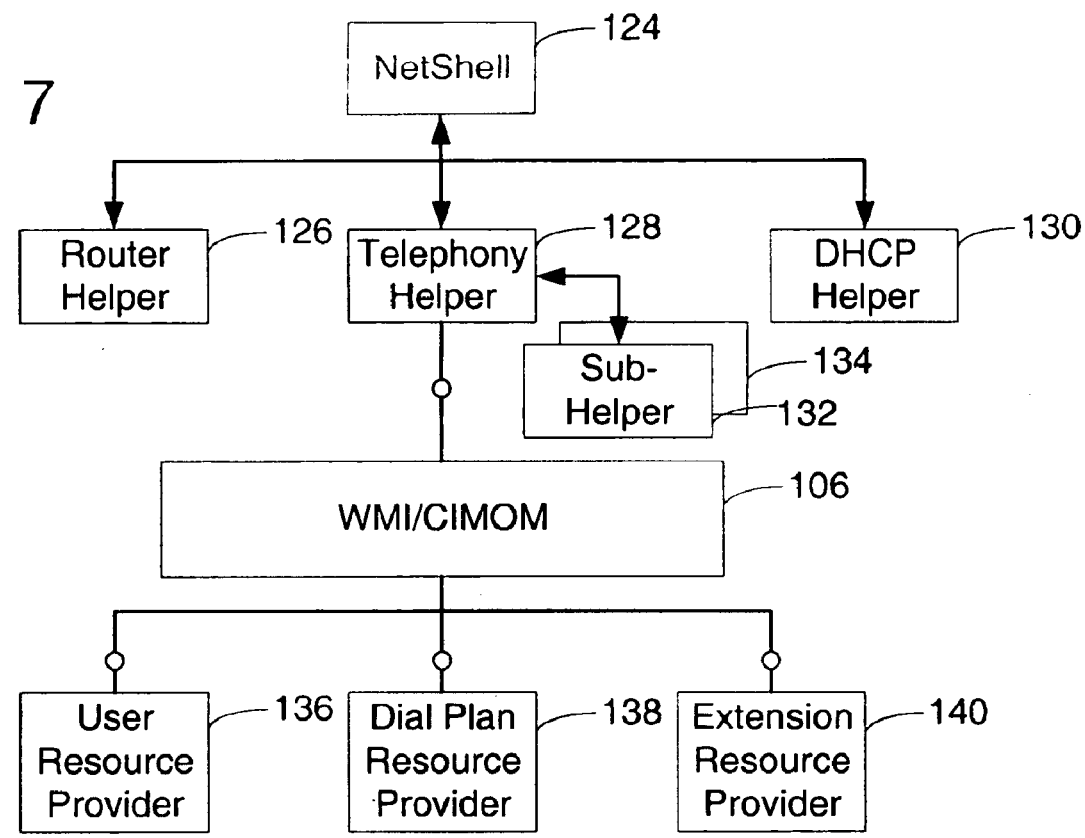
FIG. 7 is a simplified block diagram of a NetShell architecture.

In addition to the Web UI, the system of the instant invention also includes a command line interface using NetShell 124 as described briefly above and as illustrated in FIG. 7. This interface allows administrators to have Telnet access to the management console functionality. NetShell 124 is a shell-based utility that is part of the Windows 2000® operating system. It allows plug-in modules 126, 128, 130 to be added that allow the management of various components in the. Windows system. These plug-in modules 126, 128, 130 are called helper dynamic link libraries (DLLs) and provide a context for a command in the Net-Shell. When a command is entered in NetShell 124, depending on the context of the command, it is routed to the appropriate helper, e.g. 128. In the management framework of the instant invention, the helper 128 will provide a context for "Telephony." Under this main context 128, there will be several sub-contexts, 132, and 134, each of which will correspond to a component in the enterprise telephony system domain. These components are described in detail below. The helpers in the enterprise telephony system domain of the instant invention use the same back end components as the Web UI components, which are the resource providers 136, 138, 140. These providers will provide common interfaces to both these UI components. This presents a significant advantage of the instant invention.

The commands provided under the "Telephony" context and its sub-contexts preferably include "show," "list," "set," "get," "help," "exec," and "dump." The show command shows all the sub-contexts available under the Telephony context, and is an enumeration of all the Resource & Task providers available. The list command shows all the methods or attributes available under the particular sub-context, and is available only under sub-contexts. When this command is issued with no parameters, then two choices will be listed: "attributes" and "methods." When the command is issued with the parameter "attribute", then all attributes under the sub-context will be listed, although only those attributes for which the user has read access will be listed. When the command is issued with the parameter "method", then all methods under the sub-context will be listed.

The set command allows setting a value of an attribute and is preferably available only under sub-contexts. If the set command is issued without specifying an attribute, then all the attributes under the sub-context will be listed. If, however, the set command is issued with an attribute name but without a value, then help about the attribute will be displayed. This help information will typically include type information, range of acceptable values, etc. For example, if the "user" Resource has attributes 'name,' 'extension number,' etc., then all these attributes will be listed. In a similar fashion as with the show command, only those attributes for which the user has write access will be listed.

The get command retrieves the value of an attribute and is preferably available only under sub-contexts. If the get command is issued without specifying an attribute, then all the attributes under the sub-context will be listed. However, as with the above commands, only those attributes for which the user has read access will be listed. The help command is available under all sub-contexts. This help command has to be used with the name of an attribute or method as a parameter. If it is issued without any arguments, then a usage message will be displayed. If the help command is issued with an attribute name, then information about the attribute, such as type information, range of acceptable values, etc., will be displayed. If the help command is issued with a method name, then information about the method usage will be given.

The exec command is available in the top most context and has to be used with the name of the script file as a parameter. As may be expected, this exec command is used to run a script file containing a plurality of commands. Finally, the dump command is available under all sub-contexts. It is used to dump the current configuration to the screen or to a file. This can be used to create a script file with the current configuration that can then be changed to the desired configuration and uploaded. In this system, "Telephony" is the top-level context, and all resources and tasks are registered as sub-contexts under this top-level context.

In the management system of the instant invention, the management resources and management tasks are exposed through two basic steps. To implement a management resource, the first step is to define the UI components needed to expose the resource on a web page/browser and to access the resource via CLI. The second step is to implement the resource providers. This comprises a WMI Provider that provides the class definitions and generates instances of the WMI class to which the resource belongs.

The Web UI components comprise a Web UI framework, which is a hierarchy of Web page elements. Each Web page element has a set of attributes that include the WMI class name that models the resource (ObjectClass), the WMI instance that represents the resource (ObjectKey), the URL Path of the ASP page that is launched when this Web element is selected (URL Path), the File Name of the ASP Page (ASP Page), and The icon associated with this element (Graphic). These Web elements are stored in a database and form a tree structure that will act as an index tree. This index tree provides links to the ASP pages that are defined for each element. The ASP scripts include the UI components as well as the code to interact with the resource providers.

For the CLI components, helpers implement the commands for a context and are identified by GUIDs. There can be sub-contexts defined under a context, and the sub-helpers for these parent helpers are registered under the parent helpers. The helpers are preferably implemented in dynamic link libraries (DLLs). In a preferred embodiment, a single DLL can implement one or more contexts. To add a helper, the command 'add helper' is used. Once a DLL is added, it is automatically loaded by NetShell. When NetShell loads a DLL, it calls the InitHelperDLL function, which all helpers must implement and export. Inside this function, the DLL should call RegisterHelper to register the Helper with Net-Shell. The RegisterHelper function, among other things, takes the GUID of the helper and the parent helper (if it is a top level helper that is being registered under NetShell, it will be NULL) and the pointers to the Start and Stop Functions of the helper.

Once all DLLs have been initialized, NetShell will call the start functions of each helper. The TelephonyMonitor function is preferably the entry point for all the commands under the Telephony context. This function implements the commands that are valid under this context. If this function attempts to implement a command that is not a valid command, then an error message is returned. Preferably, all sub-contexts for the managed elements in the exemplary telephony system of the instant invention will register under the Telephony context.

As indicated above, the second step after defining the UI components is the implementation of the resource providers. These resource providers implement all the necessary functionalities that are required to manage a resource. The vendor who supplies and needs to manage its resource will implement these providers. Resource providers are components that act as object factories and that implement methods to manage these resources. They are preferably implemented as WMI providers, which in turn are COM servers and can be In-Proc DLLs or Out of Proc EXEs. Preferably, the WMI providers can be one or more of the following types: Class and Instance Providers; Method Providers; Property Providers; Event Providers; and Event Consumer Provider. As this statement implies, the WMI providers can be a combination of one or more of these types. Resource Providers are, for example, Class and Instance Providers as well as Method Providers. Being an Instance Provider allows WMI Instances of Resources to be created, modified and deleted dynamically, and being a Method Provider allows implementing methods for managing these resources.

To be a Class, Instance and Method Provider, various IWbemServices methods need to be implemented. The first method needed is utilized to get a Class or an instance depending on the path of the object specified. Also, a method is implemented to create or update an instance of the Resource. Another method is used to delete an instance of the Resource, while an additional method is used to enumerate the instances of a resource. Finally, a separate method is used to execute a method on the resource. In an exemplary embodiment of the instant invention, the code segments to implement these methods may appear as follows:

HRESULT GetObject ([in]const BSTR objPath, [in] long 1Flags, [in] IWbemContext pCtx, IWbemClassObject**ppObject, IWbemCallResult*ppCallResult);

HRESULT Put Instance([in]IWbemClassObject*PInst, [in] long IFlags, [in] IWbemContext pCtx, IWbemCallResult**ppCallResult);

HRESULT DeleteInstance([in]const BSTR objPath, [in] long IFlags, [in] IWbemContext pCtx, IWbemCallResult**ppCallResult);

HRESULT CreateInstanceEnum([in]const BSTR strClass, [in]long IFlags, [in] IWbemContext pCtx, IWbemCallResult**ppCallResult);

HRESULT ExecMethod([in]const BSTR strClass, [in] const BSTR strMethod, [in]long IFlags, IWbemContext pCtx, IWbemClassObject*pInParams, IWbemClassObject pOutParams, IWbemCallResult**ppCallResult);

While these methods are useful for accomplishing the basic operations on an object, additional functionality is required to do attribute level operations. Therefore, the management system of the instant invention defines some additional methods that will allow retrieving and setting values of attributes, getting help information about attributes, etc. These methods also allow resource providers to perform validation checks that return errors if the value of the attribute is being set to an incorrect value. These additional methods that a Resource provider should implement are defined as follows, including exemplary code segments:

| | |
|---|---|
| Description | This method will be used to set a value to an attribute |
| Signature | HRESULT Set ( [in] string attributeName, [in] VARIANT *pvValue). |
| Input Parameters | attributeName - is the name of the attribute whose value needs to be set pvValue - is the value that the attribute needs to be set to |
| Output Parameters | None |
| Return Value | S_OK - Success<br>E_POINTER - Null Pointer specified<br>E_INVALIDARG - Invalid Argument<br>E_OUTOFMEMORY - Out of Memory |
| Description | This method will be used to retrieve the value of an attribute |
| Signature | HRESULT Get ( [in] string attributeName, [out] VARIANT *pvValue); |
| Input Parameters | attributeName - is the name of the attribute whose value needs to be retrieved |
| Output Parameters | pvValue - the retrieved value of the attribute |
| Return Value | S_OK - Success<br>E_POINTER - Null Pointer specified<br>E_INVALIDARG - Invalid Argument<br>E_OUTOFMEMORY - Out of Memory |
| Description | This method will be used to get the default value of the attribute (if any). |
| Signature | HRESULT GetDefaultValue ( [in] string attributeName, [out] VARIANT *pvValue); |
| Input Parameters | attributeName - is the name of the attribute whose default value needs to be retrieved |
| Output Parameters | pvValue - the retrieved value of the attribute |
| Return Value | S_OK - Success<br>E_POINTER - Null Pointer specified<br>E_INVALIDARG - Invalid Argument<br>E_OUTOFMEMORY - Out of Memory |
| Description | This method will be used to get the list of valid values of the attribute. This can be used to show a list of values that the user can select from. This will eliminate the overhead of dealing with invalid entries that can result in expensive network roundtrips. |
| Signature | HRESULT GetValidValues ( [in] string attributeName, [out] VARIANT *pvValue[ ]); |
| Input Parameters | attributeName - is the name of the attribute whose valid values needs to be retrieved |
| Output Parameters | pvValue - an array of valid values for the attribute |
| Return Value | S_OK - Success<br>E_POINTER - Null Pointer specified<br>E_INVALIDARG - Invalid Argument<br>E_OUTOFMEMORY - Out of Memory |
| Description | This method will be used to get validation rules for the attribute (if any). The rules can have information on dependency on other attribute values. For example, if attribute A is set to value V, then attribute B has to be set to a non-zero value. |
| Signature | HRESULT GetValidValues ( [in] string attributeName, [out] ValidationRule *pValidation [ ]); |
| Input Parameters | attributeName is the name of the attribute whose validation rules needs to be retrieved |
| Output Parameters | pValidation - an array of validation rules for the attribute |
| Return Value | S_OK - Success<br>E_POINTER - Null Pointer specified<br>E_INVALIDARG - Invalid Argument<br>E_OUTOFMEMORY - Out of Memory |
| Description | This method will be used to get information about an attribute or method.<br>If it is an attribute, then it can include a short description of the attribute,<br>type information, Range of values (if any) etc.<br>If it is a Method then it can include information for usage, input parameters, output parameters, return value etc.<br>This will be used to display information about the attribute on the UI. |
| Signature | HRESULT Help ( [in] string attributeOrMethodName, [out] string *pHelp); |
| Input Parameters | attributeOrMethodName - is the name of the attribute |
| Output Parameters | pHelp - the localized help string |

-continued

| | |
|---|---|
| Return Value | S_OK - Success |
| | E_POINTER - Null Pointer specified |
| | E_INVALIDARG - Invalid Argument |
| Description | This method will be used to save the Resource object to a persistent store. This will be used when the user needs to save the system configuration to a persistent store. The system wide Save method will in turn call the Save method on each resource instance. |
| Signature | HRESULT Save ( [out] Object *pInst); |
| Input Parameters | None |
| Output Parameters | pInst - the instance of the Resource to be persisted |
| Return Value | S_OK - Success |
| | E_OUTOFMEMORY - Out of Memory |
| Description | This method will be used to restore the Resource object from a persistent store. This will be used when the user needs to restore the system configuration from a persistent store. The system wide Restore method will in turn call the Restore method on each resource instance. |
| Signature | HRESULT Restore ( [in] Object *pInst); |
| Input Parameters | pInst - the instance of the Resource to be restored. |
| Output Parameters | None |
| Return Value | S_OK - Success |
| | E_POINTER - Null Pointer specified |
| | E_OUTOFMEMORY - Out of Memory |

Figure 8:
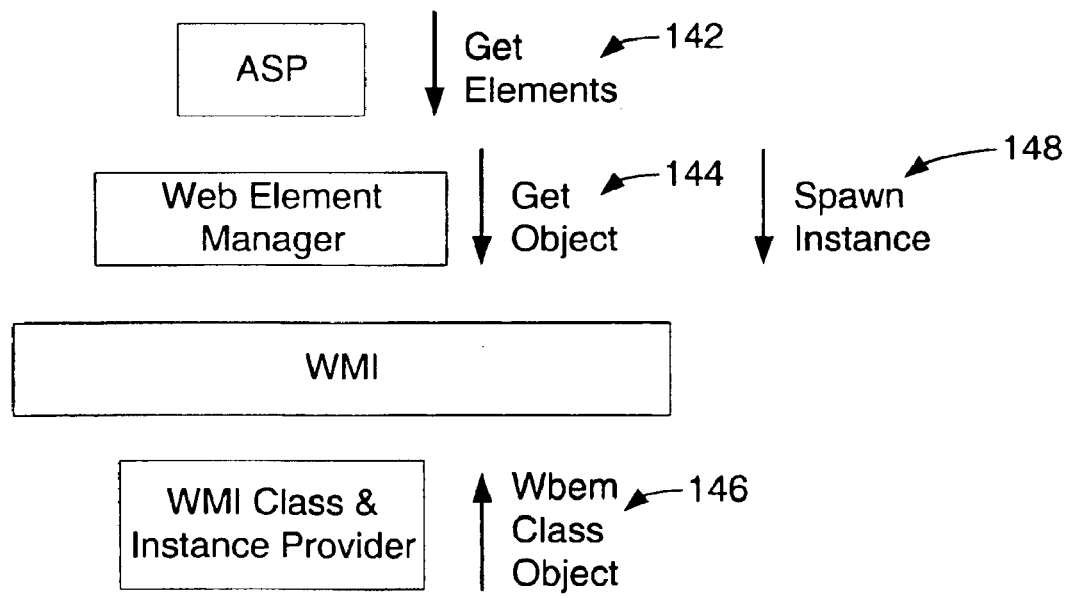
FIG. 8 is a simplified process diagram illustrating the creation of a resource in accordance with the teachings of the instant invention.

Under the management system of the instant invention, the process of creating a Resource involves several steps as conceptually illustrated in FIG. 8. First, the user selects a particular element 142 on the Web interface, which has a corresponding WMI Class. The UI component then requests the definition of the class from WMI using IWbemServices::GetObject( ) 144. WMI next identifies the appropriate Resource Provider and invokes IWbemServices::GetObject( ). Then the Resource Provider returns 146 the class definition to WMI, which in turn returns it to the UT component. Once the class definition is obtained, the UI component calls IWbemServices::PutInstance( ) 148, which results in WMI invoking the same method on the Resource Provider, which will create the instance and persists it.

Figure 9:
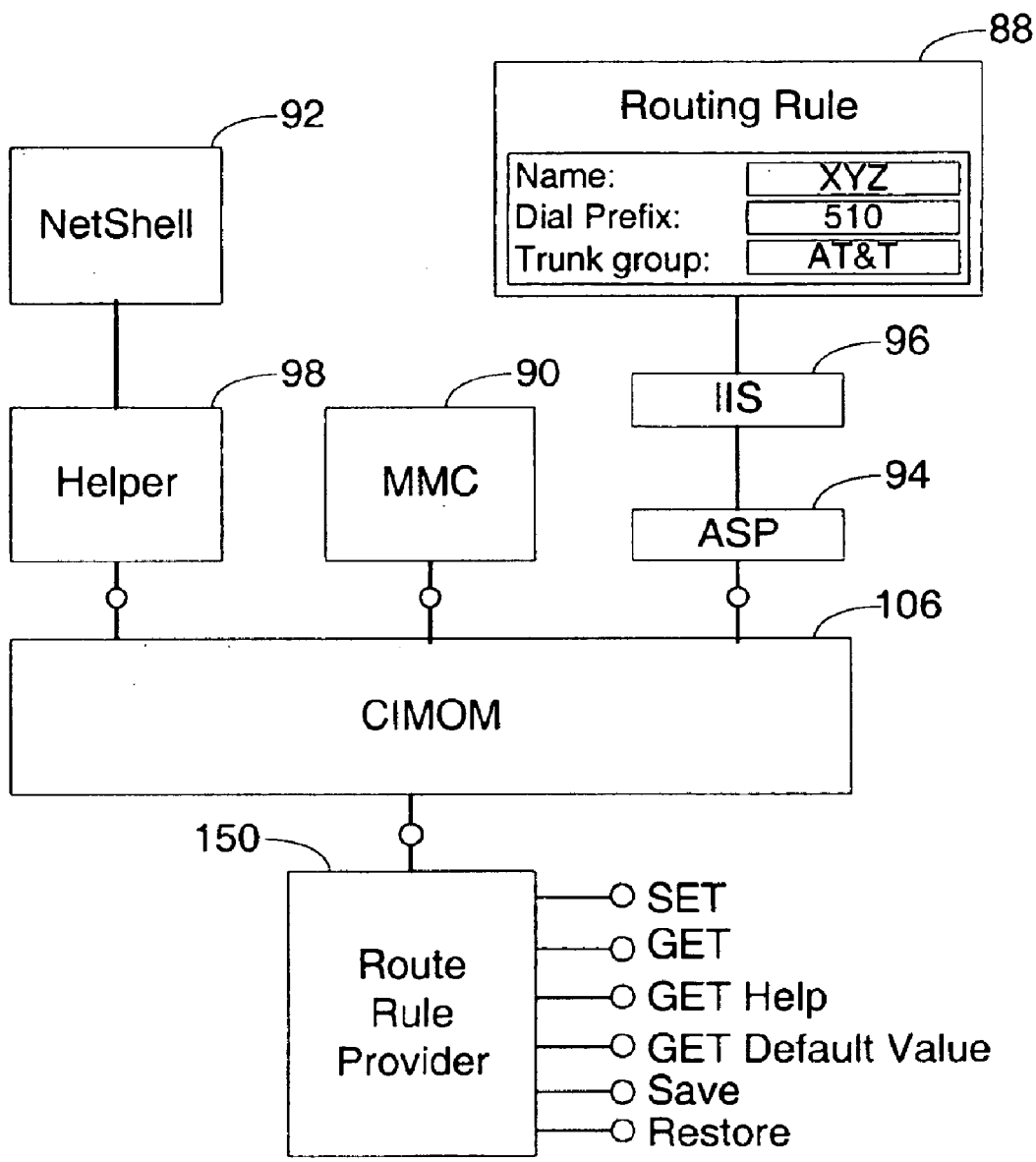
FIG. 9 is a simplified block diagram illustrating an exemplary creation of a routing rule in accordance with the teachings of the instant invention.

As an example of how the Resource Provider is implemented in an exemplary embodiment of the instant invention, the following will demonstrate the implementation of a Routing Rule in the exemplary implementation of the management system of the instant invention as illustrated in FIG. 9. In a telephony system, the Routing Rule determines which Trunk Group to use depending on the dial prefix employed. Therefore, there are two attributes associated with a Routing Rule, the Dial-prefix and Trunk Group. The MOF (Managed Object Format) file holds the definition of the class as follows:

```
[dynamic,
provider("VA_RoutingRuleProv")
]
class VA_RoutingRule
{
  [key] string GUID;
  string routeRuleName;
  string    dialprefix;
  VA_TrunkGroup ref refTrunkGroup;
  //methods
uint32 Set ( [IN] string attributeName, [IN] VARIANT *pvValue);
uint32 Get ( [in] string attributeName, [out] VARIANT *pvValue);
uint32 Help ( [in] string attributeOrMethodName, [out] string *pHelp);
uint32 Save ( [out] Object *pInst);
uint32 Restore ( [in] Object *pInst);
};
```

In this example, the qualifier 'dynamic' indicates to WMI that the provider should be used to generate instances. The provider qualifier identifies the name of the provider that is associated with this class. Note that every class should have a key attribute. This attribute is used to identify an instance uniquely (similar to a key in a database). Since GUIDs are unique, they can be used as the key values.

The Trunk Group associated with the routing rule is represented by another resource. Accordingly, an instance of VA_RoutingRule will hold a reference to an instance of the trunk group. The MOF file for the provider 150 of this Resource is defined as follows in this exemplary embodiment;

```
instance of__Win32Provider as $P
{
   Name="VA_RoutingRuleProv";
   CLSID = "{7D37ACC6-30CC-11d3-BF3E-005004602632}";
};
instance of__InstanceProviderRegistration
{
   Provider = $P;
   SupportsGet = TRUE;
   SupportsEnumeration = TRUE;
   QuerySupportLevels = { "WQL:UnarySelect" };
};
instance of__MethodProviderRegistration
{
   Provider = $P;
};
```

The CLSID represents the COM server that implements the provider 150. The instances of __InstanceProviderRegistration and __MethodProviderRegistration inform WMI 106 that this provider 150 is capable of generating instances and executing methods for the class VA_RoutingRule. Once this is complete, a COM server (either InProc or EXE) is defined and all the required interfaces are implemented. Finally, this server is registered with COM with the CLSID in the MOF file. WMI uses the CLSID to load the correct provider when a client application requests an instance of this class.

To retrieve instances of this class VARoutingRule, the class definition must be retrieved and then the instances must be enumerated. In addition to this, the security impersonation level must be set so that WMI will be able to make calls to their interface pointers. In an exemplary embodiment, the ASP script for this is as follows:

```
<%@ LANGUAGE="VBSCRIPT"%>
<HTML>
<HEAD>
<TITLE>Enumerate Route Rules</TITLE>
</HEAD>
<BODY>
<%
on error resume next
   Set Locator = CreateObject("WbemScripting.SWbemLocator")
Set Service = locator.connectserver
ifErr = 0 then
   %>Connected to WMI!
<%else%>
   Sorry, Did not connect.
<%if Err = 0 then
'Retrieve the class'
Set RoutingRule = Service.Get ("VA_RoutingRule")
Set Routes = RoutingRule.Instances_
   'Set impersonation level
   'to use credentials of caller
Routes.Security_.impersonationLevel = 3
for each RoutingRuleInstance in Routes%>
      <%
Next
   %>
</BODY>
</HTML>
```

When using Scripting to access WMI, there are some security issues involved as will be recognized by one skilled in the art. If the DCOM impersonation level is not set to the correct level, then the provider may not be able to get the information that the client (script) is requesting. There are four levels of impersonation that can be set in DCOM. The first level hides the credentials of the caller. Calls to WMI may fail with this impersonation level under the system of the instant invention. The second level allows the objects to query the credentials of the user, however, calls to WMI may also fail with this impersonation level. The third level allows the objects to use the credentials of the user, and is the recommended impersonation level under the management system of the instant invention. The fourth level allows objects to permit other objects (delegate) to use the credentials of the caller. As this may present a security risk, it is not recommended.

As will be apparent to one skilled in the art from the foregoing, a significant advantage is provided by the management framework of the instant invention by decoupling the back end components from the user interface. In this way, a user of the management framework will experience the same consistent behavior regardless of which user interface is being used. This consistent behavior will provide the same checks, help, error strings, etc. Additionally, the management framework of the instant invention allows the flexibility of adding new user interfaces without the necessity of changing the back end components. This advantage is provided through the WMI framework which provides a COM based object manager model. In this way, any interface that can talk to a COM server can talk to the management model of the instant invention. By providing a standard set of interfaces for the WMI providers of the instant invention, consistent enterprise management may be accomplished from any type of user interface.

As an example with reference to FIG. 9, if a user desires to set the value of an attribute of one of the managed elements of the enterprise system utilizing NetShell, the user would simply invoke the standard interface "set" method designating the name and value of the attribute to be set. NetShell simply inputs the value and CIMOM calls the provider "set" method. NetShell no longer cares what the value is since all checks of the value are done by the set interface by the provider. The provider then returns a localized error string which NetShell then displays to the user. This performance is the same whether MMC or a web-based user interface are utilized to set the value of the attribute. To change the value or the behavior of the user interface in the system of the instant invention, one only need to modify the provider itself without concern for any other changes anywhere else in the system. This is accomplished because every component has knowledge of the management data and is self-contained. The standard interfaces of the instant invention perform the necessary work without the client process having knowledge of the component's data.

As an example of the benefit provided by the above-described standard interfaces, the following is an exemplary discussion of the configuration of an enterprise telephony server. As will be recognized by one skilled in the art, an enterprise's telephony server will include many attributes, some of which are liable to be quite complex, which all must be set in order to allow operation of the telephony system. Unfortunately, many smaller enterprises do not employ individuals which have sufficient knowledge or the resources to configure such a large and complex system. Utilizing the management framework of the instant invention, a configuration of the entire telephony system may be implemented at the telephony vendor location based upon the requirements of the enterprise. This configuration may then be provided to the enterprise on a disk or via other media so that it can be uploaded to their particular installation through the restore configuration interface. Such was not available in the prior systems. Such a save and restore configuration interface is made possible because every component provider knows what it needs to persist, what it will need to upload, where it wants to persist, how it wants to persist, etc. In other words, every component provider has the knowledge of what data it needs to save, how it wants to save that information, and how to upload that information to restore an operable configuration to the system. With as many providers as are required in a typical enterprise system, these standard interfaces defined by the instant invention become the basic building blocks of enterprise system management.

Further, the management framework of the instant invention also includes transaction support to ensure that the restore configuration interface succeeds in all aspects necessary for task completion. That is to say, if a configuration has many operations which must successfully be completed for a configuration to be complete, the failure of any one operation will allow rollback capability to alert the user of the failure of one of these operations so that the problem may be corrected and the configuration completed. Further, since multiple user interfaces are available, it is conceivable that multiple users may attempt to manage the same component at the same time through different user interfaces. To prevent such an occurrence from leading to unknown system configuration, a common point is instituted in the providers to ensure that only one operation is being attempted on a particular service or feature at any given point. If the provider is busy with another operation, a message informing the user is generated. This transaction support is possible since all attributes for each component are data driven, that is there are no static pages at the UI level to be updated.

The system of the instant invention also provides a customizable user interface which may be based, for example, on the expertise level associated with each particular user. Once the user has been authenticated through appropriate means, the provider then uses the Active Directory which has information about all of the users to retrieve an expertise level so that the provider knows what type of user interface to provide. Based on this expertise level, the provider may not show certain help features if it is determined that the user is a knowledgeable user, or may show additional help for each attribute on different pages for novice users. This expertise level may be changed as appropriate so that nuisance help messages to a more experienced user are not displayed. In addition, dynamic localization is provided by the management framework of the instant invention. This localization may be based upon user settingsin the Active Directory, or more preferably based upon the browser language settings of the web UI. By utilizing dynamic localization based upon the language settings, the user experience is made more pleasant, simpler, and more cost effective. Unlike many web sites which provide separately addressed pages for different languages, the dynamic location of the instant invention is accomplished through the back end provider based upon the language settings. As such, a user may access the same addressed locations and receive different language pages based solely on the language setting of the user's browser.

With an understanding of the implementing of the Management Resources now firmly in hand, attention is turned to the implementing of Management Tasks under the management system of the instant invention. Management Tasks can be defined as software components that provide a specialized functionality to execute certain management related operations. These operations will usually result in some kind of interaction with management components, and are modeled using WMI methods. As with management resources, there are two steps involved in exposing Management Tasks. The first is to define the UI Components. This comprises the UI components needed to expose the Task on a web page/browser and to access the resource via CLI. The second is to implement the Resource Providers. This consists of a WMI Provider that provides the Methods associated with the Task.

As in the case of Resources, the Task's UI components are stored in the UI Framework. The difference is that there is only an ObjectClass associated with the Task, as the actual instance on which the method has to be invoked will be determined at run time. Therefore, the Web page element's attributes comprises the WMI class name that models the Task (ObjectClass), the URL Path of the ASP page that is launched when this Web element is selected (URL Path), the File Name of the ASP Page (ASP Page), and the icon associated with this element (Graphic). The ASP scripts have the User Interface Components as well as the code to interact with the Task Providers. The CLI components are similar to implementing CLI components for Management Resources as discussed above.

The Task Providers implement all the necessary functionalities that are required to implement a Management Task. They are implemented as WMI Method providers, which in turn are COM servers and can be In-Proc DLLs or Out of Proc EXEs. To be a Method Provider, certain IWbemServices methods need to be implemented. For example, a method to be used to execute a method on the resource needs to be implemented. As an example, the code segment for this method may appear as follows:

HRESULT ExecMethod([in]const BSTR strClass, [in] const BSTR strMethod, long lFlags, IWbemContext pCtx, IWbemClassObject*pInParams, IWbemClassObject*pOutParams, IWbemCallResult**ppCallResult), where:
  strClass—object path to the class that contains the method
  strMethod—is the name of the method
  lFlags—flag. If set to zero, it will execute synchronously
  pCtx—pointer to context, typically NULL
  pInParams—pointer to Input parameters. NULL if there are no input parameters
  pOutParams—pointer to Output parameters. NULL if there are no output parameters
  ppCallResult—will contain the result. If NULL on entry, this is not used.

All Task Providers should implement the following method:

| | |
|---|---|
| Description | This method will be used to get information about a method. It can include information for usage, input parameters, output parameters, return value etc. |
| Signature | HRESULT Help ( [in] string methodName, [out] string *pHelp; |
| Input Parameters | methodName - is the name of the attribute |
| Output Parameters | pHelp - the localized help string |
| Return Value | S_OK - Success<br>E_POINTER - Null Pointer specified<br>E_INVALIDARG - Invalid Argument |

To aid with an understanding of the instant invention, attention is returned to the example of the Route Rule discussed above. If, in this example, the system requires the association of a Task "Add a Route Rule" that will be used to create a new Routing Rule, then an exemplary embodiment of the class definition, in a MOF (Managed Object Format) file, holds the definition of the class as follows:

```
[dynamic,
provider("VA_RoutingRuleTaskProv")
]
class RouteRuleTaskProv
{
Static: uint32 Add([IN] string RouteRuleName,[IN] string DialString,
[IN] VA_TrunkGroup refTrunkGroup);
   Static: uint32 Help ( [in] string methodName, [out] string *pHelp);
}
```

The MOF file for the provider of this Task will be defined as follows:

```
instance of_Win32Provider as $P
{
   Name="VA_RoutingRuleTaskProv";
   CLSID = "{7D37ACC6-30CC-11d3-BF3E-005004602633}";
}
instance of_MethodProviderRegistration
{
   Provider = $P;
};
```

Preferably, the Management Tasks will be implemented as wizards in the Web User Interface As such, the user is guided through a series of steps that will accomplish the management operation. These wizards can be customized in different ways, including according to the configuration of the system. Depending on the hardware and software components that are installed on a particular enterprise telephony system, the wizard is automatically customized to show only those steps that are relevant to the configuration. For example, if a new User is being added using the Add User wizard, one of the steps in the wizard will be configuring the RAS properties for the user. However, if the system is not configured to be a RAS server or there are no RAS capable devices installed, then this step will not be shown to the user. The wizard may also be customized according to the expertise level of the user. After the administrator has used the wizards for some time, he/she may not want to go through all of the steps. In this case, all the steps can be combined into a single step to make the task execution faster. The expertise level is preferably a user attribute that can be set when the user is created in the system.

As introduced above, the management framework of the instant invention utilizes object-oriented schema. A schema defines a set of objects that can be created and the attributes that can be used to describe those objects. The definition of an object in the schema, commonly called a class, will contain a list of attributes that an instance of a class must have to be stored in the directory, a list of attributes that an instance of a class may have to be stored in the directory, a list of classes that can be parents of the instances of the class, and a list of classes from which the class is derived. In the exemplary embodiment of a telephony system, the telephony management classes (TMCs) are derived from either X.500 classes or the CIM classes. X.500 provides classes such as Top, which is the root class for the directory, and OrganizationalPerson, which is used to define the concept of person in an organization. Active Directory (AD) schema has a class "User" that is derived from OrganizationalPerson. For the system of the instant invention, an Auxiliary class is defined that contains additional attributes to model the telephony user.

On the other hand, CIM provides classes such as LogicalElement, which is used to represent elements that are used to realize one or more Logical elements. This class is derived from ManagedSystemElement. Examples for a telephony system include Trunk Groups, Route Rules, Dial Plan, etc. A second class provided by CIM is PhysicalElement. This class is used to represent elements that have a distinct physical entity. This class is also derived from ManagedSystemElement. Examples in the exemplary telephony system include Extensions, Trunks, etc.

The Active Directory (AD) is preferably used as the storage mechanism for the management information utilized in the instant invention. This is because AD is reliable, replicable, secure, and distributed. Active Directory is included with the Windows 2000 operating system. It extends the features of the previous Directory services and adds new features to it. One of the key advantages of integrating with AD is that there is a unified User Database. In traditional PBX systems, there was no relation between the user's attributes as stored on the PBX and other systems such as email or file security. This meant that the same user had to be added to multiple databases and often by different administrators, which could result in inconsistent information. The management system of the instant invention eliminates this overhead of having multiple user databases.

The second advantage of AD is the ability to define User Policies that determine the services a User or Group can access. This can be quite handy for administrators to be able to apply policies to a set of users and be able to modify policies as required. For example, consider Company X has two types of employees, namely Full Time and Contractors. Every user in the system will belong to one of these groups. Policies that define access to various services will be in place for each group. If the company has a policy that only Full Time employees can make outbound international calls, then this attribute can be set to 'true' in the Full Time Employees Group policy, automatically giving access to this service for all users in this group. If there is a special case, such as if a particular Contractor needs to be given this permission, then the user policy for this particular user can be modified to reflect this change. Since the user's policy will override the Group's policy, the user will gain access to this service. However, the Group policy will still apply to the remaining users in the group.

A third advantage of using AD is security. AD allows security to be defined at the object and at the attribute level. Access Control Lists (ACL) protect all objects in the Active Directory. ACLs determine the type of access to an object depending on which user is trying to access it. ACL is a list of Access Control Elements (ACE). Each ACE contains a Security descriptor that identifies the User or group to which it applies and the type of access. ACEs can apply to objects or attributes, which gives a very fine grained control to the administrator of not only what objects a user can see or modify, but also which attributes in the object can be seen or modified.

Active Directory Services Interfaces (ADSI) provides a rich set of COM interfaces that can be used to browse or extend the schema, add objects and modify attributes in the Active Directory. The Resource and Task Providers can use these interfaces to access the ADS. ADSI solves the problem for customers who have multiple directories and multiple interfaces to deal with. It can be compared to ODBC. ODBC provides open interfaces for relational databases, thus allowing developers to write applications and tools that will work with any database that supports ODBC. Because of the thriving ODBC development community, every major relational database now supports ODBC. ADSI is "ODBC for directory services."

To use Active Directory as the storage mechanism, the schema has to be extended to represent the managed elements for the exemplary telephony system of the instant invention. The schema is extended using the Active Directory Schema Manager snap-in. The management data is updated and accessed using Lightweight Directory Access Protocol (LDAP). Active Directory in Windows 2000 is compliant with LDAP 3.0, and the LDAP API can be used to access data in Active Directory. ADSI provides uniform, object-oriented access to multiple directories, and supports directory access in Windows 2000, Windows NT 4.0 and Novell Netware Directory Services (NDS). The LDAP Provider is used to access AD in Windows 2000 environment. Since ADSI provides COM based interfaces, it can be accessed using high-level languages like C/C++ or scriptable languages like Visual Basic. In the telephony scenario of the exemplary embodiment of the instant invention, Resource and Task providers will access ADSI. Since these providers are written using C++, the following discussion will be confined to such language, although one skilled in the art will recognize that such discussion is for purposes of illustration only, and is not limited solely thereto.

For schema management, the Active Directory Schema Manager allows schema administrators to extend the schema by creating and modifying classes and attributes. The schema manager is a MMC snap-in. There are some prerequisites that have to be met in order to change the AD schema. For security reasons, schema management is restricted to a group of users called schema administrators. Only those users logged in as a member of schema administrators group can perform schema management. Further, schema operations are restricted to support only one master, which means that only one domain controller can modify the schema at any given time. This is called Floating Single Master Operations (FSMO) and is described in detail in a co-pending application entitled "Floating Single Master Operation", filed an on Sep. 21, 1998 as application Ser. No. 09/157,774. The schema FSMO can be transferred from one server to another by simply right clicking on the root of the schema manager and selecting "Change Domain Controller." The dialog-box that pops up can be used to change the FSMO.

To allow a domain controller to change the schema, a registry entry has to be added. The key is "Schema Update Allowed" and its value is of type DWORD. This has to be set to a non-zero value to allow schema updates. The Schema Manager can also be used to create new attributes. Right clicking on the "Attributes" node, brings up a menu from which selecting "sew" pops up the New Attribute Dialog box. The common name, LDAP name and Object Identifier for the attribute has to be specified. Object Identifiers (OID) are issued by Standards bodies such as ITU, which the organization has to obtain for their use.

In addition to schema, new classes may also be created. Classes can be of different types namely Structural, Abstract and Auxiliary. However, the structural class is the only class from which AD objects can be created. The created classes can be derived from Structural or Abstract classes, and can have Auxiliary classes associated with it. Abstract classes are similar to abstract classes in C++, and serve as templates that can be used to create other classes. Auxiliary class is used to extend a structural class and comprises a list of attributes that can be associated with one or more structural classes.

To access the AD, one has to find the domain controller and bind to the object in the directory. In ADSI, the directory object is represented as a COM object, which means that the binding requires that a COM interface be specified. All ADSI COM objects that represent directory objects have an IADs interface. It will also have other interfaces depending on the type of the object. For example, a user object has a IADsUser interface in addition to the IADs interface. To bind to a directory object, either ADsGetObject or ADsOpenObject can be used, the difference being the Get operation uses the currently logged on user's credentials whereas the Open operation allows a specific user's credentials to be supplied. It is recommended to use the logged on user's credentials. If the data exchange between the provider and AD needs to be encrypted to protect it over the network, then the Open operation should be used. If NULL is specified for user and password, then the Open operation uses the current logged on user's credentials.

The server name should not be hard coded when binding to the directory. AD supports serverless binding which means that the server name need not be specified when accessing AD of the logged-on user's domain. When processing the "bind" call, ADSI finds the "best" Windows 2000 Domain controller in the domain of the user currently logged on. In LDAP 3.0, rootDSE is defined as the root of the directory information in the directory server. The rootDSE provides information about the directory server. ADsPath string for rootDSE is LDAP://rootDSE or LDAP://servername/rootDSE. The first option is used when doing serverless binding. rootDSE is a well-known and reliable location on every directory server to get DNs to the domain container, schema container, configuration container and other information. It has information about the directory server, and it preferably includes the following information:

| Property | Description |
| --- | --- |
| namingContexts | Multi-valued. Distinguished Names (DN) for all naming contexts stored on this directory. |
| DefaultNamingContext | By default, the DN for the domain of which this directory server is a member |
| SchemaNamingContext | DN of the schema container |
| ConfigurationNamingContext | DN for the configuration container |
| DnsHostName | DNS address of the directory server |

All ADSI COM objects have one or more interfaces with methods that retrieve the properties of the directory object they represent, including a specific property by name, a list of properties, enumerate all properties on the object, and to get special properties. Specifically, IADs::Get is used to get the value of a single valued attribute and IADs::GetEx is used to get the value of a multi-valued attribute. IDirectoryObject::GetObjectAttributes is used to specify a list of attributes to get. It returns an array of structures that contain the values of the requested attributes. Further, the IADsPropertyList interface has methods to enumerate the properties, and the IADs interface has methods to get some special properties that are not stored in the object. IADs also has methods to get values in a data format that is different from the format that is stored.

Setting properties is similar to getting properties. However, when setting a property, the value is only written to the local property cache on the client machine until the SetInfo method is called. This allows the properties to be written to local cache and uses SetInfo only when the data is in a consistent state. As with getting properties, setting properties may be used to set a specific property by name and to save the current value of the property. Specifically, IADs::Put is used to set the value of a single valued attribute to the local cache and IADs::PutEx is used to set the values of a multi-valued attribute to the local cache. Further, IADs:SetInfo is used to save the current value of the property from the property cache to the underlying directory store. SetInfo will update objects that already exist or create a new directory entry for newly created objects.

As introduced briefly above, there are a number of security issues that are involved when accessing WMI and the management data. It is important that the calls to ADSI to retrieve management data from Resource and Task Providers are done using the client user's credentials so that the correct security is enforced. In the enterprise telephony management scenario of the instant invention, there are two types of clients that can access management data. They include Web UI using ASP/IIS and CLI using NetShell.

User authentication can be done using Windows integrated authentication using NTLM or Kerberos. Kerberos authentication allows delegation to be used to transfer impersonation credentials over more than one cross-host hop. This is useful if IE, IIS and WMI are running on different hosts. If at least two of them are running on the same machine, then NTLM can be used.

As will be understood by one skilled in the art, a privilege is the right of an account, such as a user or group account, to perform various system-related operations on the local computer, such as shutting down the system, loading device drivers, or changing the system time. Each Windows 2000 user has a list of privileges defined against the account. When the user is authenticated, an access token is created that reflects the privileges of the user. When a system operation is attempted, then the user's privileges are checked to verify the privileges. The operation is allowed only if the privilege is enabled.

For DCOM in Windows 2000, the concept of cloaking has been introduced. When this is enabled on the proxy, privilege settings on the current thread are marshaled to the server at the point of invocation of the call on the remote proxy. This allows privileges to be scoped for each operation by setting them before an operation and resetting them after an operation. The DCOM authentication level determines when security checks are made. There are different levels of authentication that can be used as follows:

| Authentication Level | Security Level |
| --- | --- |
| None | No authentication and the least amount of security. |
| Default | The level of security is set to Authentication Service. |
| Connect | Authenticate security on an initial connection to the DCOM server. |
| Call | Authenticate security on every call accepted by the DCOM server. |
| Packet | Authenticate all data with the sender's identity. |
| Packet Integrity | The sender's identity and signature are encrypted to ensure the authenticity of the sender and to ensure that packets haven't been changed during transit. |
| Packet Privacy | The sender's identity and the data are encrypted to ensure maximum security. |

The DCOM impersonation level allows the server to use the client's permissions when making calls. This will ensure that the client's access permissions are used to access system data. There are different levels of impersonation that can be used. For WMI, the recommended impersonation level is 3, which allows WMI to use the credentials of the user. This means the credentials of the user is passed to the provider for operations on Active Directory.

In a preferred embodiment of the instant invention, two levels of diagnostics will be available. High-level diagnostics can include things like restarting trunks, getting status of extensions etc. This will be available through the enterprise telephony management console with Web UI and CLI. Low-level diagnostics can include real time monitoring of trunks for timing/framing errors, monitor data flow for debugging extensions, etc. These low-level diagnostics will be available from separate applications which will be supplied by the respective hardware vendors.

In general, the management system of the instant invention, in a preferred application to an enterprise telephony system, will include alarms that will signal when a component is faulty. These alarms can be reported in different ways, including indication on web UI, via dial out modem on a out of band card, an SNMP alert (out of band), via pager, e-mail, or via NT Eventlog. The system also includes logging to text files with different levels of detail, as well as a change log to indicate changes made to the system configuration and by whom. The system of the instant invention also restarts components when faulty, and includes a watchdog timer for monitoring system resource usage (media resources like ASR/TTS), status of components, restarting faulty components, etc. Out of band control using special boards is also included, as is online help that will give easy access to technical manuals for various boards and hardware.

Specifically for trunks, the system of the instant invention provides high-level diagnostics which include alarms that signal when a trunk is faulty. The system may also seize individual trunks for listen-in (to check status or detect toll-fraud) and dialing out. Preferably, the operator can listen-in on idle trunks and the administrators can listen-in on active calls. The status of all trunks may also be displayed on the Web UI (with color codes). Logging with different levels is also available to trace calls in a preferred embodiment. Further, the system includes the ability to get physical location of a trunk such as which board it is connected to, etc., as well as the ability to restart individual trunks when faulty. The low-level diagnostics for the trunks include real time call tracing in GUI and file for debugging, and real time data flow monitoring for framing/timing errors.

With regard to extensions, the high-level diagnostics provided include alerts when an extension is faulty, and the ability to remotely control extension for testing. Further, the status of all extensions on web UI (with color codes) is provided, as is the ability to get the physical location of an extension, such as the board to which it is connected, etc. The low-level diagnostics include real time call tracing for debugging and real time data flow monitoring.

Another aspect of the system of the instant invention is its ability to localize. The Web User Interface will be localized to support different languages. Specifically, the ASP Pages that make the UI components are localized for the various languages. So, each ASP page will have a localized version in every language supported. These ASP Pages will have the same file names and will be stored in a separate directory for each language. For example, if the server name is "Telephony" and all the ASP pages are stored under the IIS virtual directory ManagementScripts, then each language will have a sub-directory under this directory. Therefore, all English ASP Pages will be stored under ManagementScripts/en, all German ASP Pages will be stored under the ManagementScripts/de, etc.

The localization is done on a per session basis. In ASP, a new session starts when the user requests a URL that identifies an ASP page in the application. A globala.asa file has to be defined which will have procedures defined for the session management. The language for the session is determined by the browser's language setting that is sent to the server along with other information when it makes a request to the server. This language setting is determined by using the HTTP header information. The user is then redirected to the ASP page for that language using the Redirect method. The start page for the language is different for the management console according to the language setting of the browser. This way, every user can dynamically localize their session with the Management console according to their choice of language, simply by changing the language setting on the browser.

With this understanding of the operation of the system of the instant invention, attention is now focused on the managed components of the system. The enterprise telephony system in which the management framework of the instant invention is exemplary embodied is communications server that provides both data and voice related services. As such, the components that need to be managed by the system of the instant invention include users, extensions, dial plans, trunks, trunk groups, supplementary services, call logging, call routing, remote access service (RAS) server, router, dynamic host configuration protocol (DHCP) server, DNS server, and proxy server. Each of these managed components will be addressed in turn below.

The Active Directory Schema has a "User" class that represents a User in the Windows environment. In the enterprise telephony domain, some attributes are added to this User class. These attributes are part of an Auxiliary class "Telephony User" which will be an extension to the User class. The prefix ms-Tel will be used for the class and attribute names, and the LDAP names will be the same as Common Names, except that they will not contain hyphens. An example of this TelephonyUser class follows:

| Common-Name | ms-Tel-TelephonyUser |
| --- | --- |
| Class Type | Auxiliary Class |
| Subclass of | Top |
| Admin Description | Auxiliary class for Telephony User |

Now, attributes that will extend the "User" class to hold information that will be relevant to a user in the enterprise telephony system will be added using a naming convention for these attributes as follows:

| Attribute | Type | Description |
| --- | --- | --- |
| ms-Tel-DirectoryNumber | String | Main number for user |
| ms-Tel-AdditionalNumbers | Array of Strings | Additional numbers for user |
| ms-Tel-VoiceMailNumber | String | The voice mail number |
| ms-Tel-VoiceMailPassword | String | The password used when accessing voice mail |
| ms-Tel-CallForwardOnBusy | String | The number the call should be forwarded to when the user's extension is busy |

-continued

| Attribute | Type | Description |
|---|---|---|
| ms-Tel-CallForwardOnNoAnswer | String | The number the call should be forwarded to when the user doesn't answer the call |
| ms-Tel-CallForwadImmediate | String | The number all calls are forwarded to |
| ms-Tel-ClassOfService | Object | Provisioning for various telephony features |
| ms-Tel-CallPickupGroup | Object | Call pickup group to which the user belongs |
| ms-Tel-ExpertiseLevel | Enum | Determines the expertise level of user and can be one of the following Novice Expert |

The various tasks associated with User Management and the corresponding actions that need to be taken are as follows:

| Task | Task Description |
|---|---|
| Add a User | Add a new user |
| Delete a User | Remove an existing user |
| Edit User's Profile | Edit an existing user's profile |
| Save User's Profile | Save User profile to a persistent store |
| Restore User Profile | Restore User Profile from a persistent store |
| Enable RAS access for user or group | Used to give a user RAS permissions |
| Configure RAS properties for user or group | Used to specify RAS properties for user that can include Verify Caller ID or Enable callback Static IP address (if any) Static route (if any) |
| Configure User Telephone properties | Used to specify Telephone properties for user that can include Extension number Type (Analog, IP etc) Voice Mail number Call Forwarding info |
| Configure Proxy permissions for user or group | Enable users or groups of users to access internet. |
| Configure Maximum Mailbox size for user or group | Used to specify the maximum size of a mailbox |
| Configure Class of Service | Used to specify the Class of service attributes for the user |

Under the system of the instant invention, the processes of adding a User requires that the Class User is obtained, an instance of User is created, the values of the attributes are set, and the instance is saved.

The second type of component is an Extension. Extensions can be of many types ranging from an Analog Telephone to an IP Phone. Depending on the type of extension, some attributes may be relevant and some may be not. Since Extensions are physical elements, a class is derived from class Physical-Element as follows:

| Class | Telephony-Extension |
|---|---|
| Type | Structural Class |
| Subclass of Auxiliary-Classes | Physical-Element |

The Extension's attributes include the following:

| Attribute | Type | Description |
|---|---|---|
| Manufacturer | String | Name of the manufacturer |
| Directory Number | String | The Directory Number of the extension |
| Type | Enum | Type of extension can include Analog, Digital, IP etc |
| Gatekeeper Address | String | Gatekeeper to be used (for IP phones) |
| Board Address | String | Will include board address and position (for analog & digital phones) |

The tasks associated with Extensions include the following:

| Task | Description |
|---|---|
| Add an Extension | Used to create a new extension and the following needs to be specified Name Directory Number Type (Analog, ISDN, IP, etc) Board and position (in case of Analog or digital phones) Gatekeeper address (in case of IP phones) |
| Remove an extension | To delete an extension |
| Edit an extension | To edit the attributes of an extension |

The dial plan is the brains of the call routing system. Based solely on the digits in the dialing string, the dial plan can make intelligent decisions as to where the call should be delivered. Dial Plans are logical elements. Therefore, a class is derived from CIM class Logical-Element as follows:

| Class | Telephony-DialPlan |
|---|---|
| Type | Structural Class |
| Subclass of Auxiliary Classes | Logical-Element |

The Dial Plan attributes include the following:

| Attribute | Type | Description |
|---|---|---|
| Name | String | The name of this dial plan in the system |
| Y | Integer | A variable that can be assigned digits 0 or 1 |
| N | Integer | A variable that can be assigned digits 2–9 |
| X | Integer | A variable that can be assigned digits 0–9 |
| Termination Digit | Character | Terminating Digit |
| Pause Digit | Character | Pause Digit |
| DN | String | Directory Number |
| NPA | String | Number Plan Area |
| N11 | String | Service Access Codes (SAC) |
| NsN | String | National Significant Number 9–15 digits |
| CAC | String | Carrier Access Codes (10XXX, 101XXX) |
| CC | String | Country Code (1–4 digits in length) |
| CTY | String | City Code (1–2 digits in length) |
| AUTH | String | Authorization Codes (1–10 digits in length) |
| LEC | String | Account Codes (1–10 digits in length) |
| Pattern (+n Instances) | ID | Registered patterns |

The tasks associated with Dial Plans and the corresponding action to be taken includes:

| Task | Description |
|------|-------------|
| List | The Administration Application will have the ability to list all dial plan entries currently configured in the system. |
| Query | The Administration Application will have the ability to query the system for configuration information for each dial plan entry in the system. |
| Add | The Administration Application will have the ability to add new dial plan rules to the system. When adding a new dial plan entry, the Administration Application will be able to set any and all of the configuration parameters defined in the previous section. Any new dial plan entry that is added to the system will be useable immediately without requiring a restart. |
| Delete | The Administration Application will have the ability to remove or delete a dial plan entry from the system. Before removing the dial plan entry from the system, the Administration Framework must ensure that no other dial plan entries are dependent on the entry being removed. |
| Modify | The Administration Application will have the ability to modify or update any or all of the dial plan configuration parameters in the previous section. This modification should take place in real time, without requiring a restart. |

Trunks connect the telephony server to the public network, and can be of many types, such as Analog, ISDN, IP, etc. Since Trunks are physical elements, a class is derived from the CIM class Physical-Element, and its attributes are as follows:

| Class | | Telephony-Trunk |
|-------|--|-----------------|
| Type | | Structural Class |
| Subclass of | | Physical-Element |
| Auxiliary Classes | | |
| Attribute | Type | Description |
| Name | String | Name of the trunk |
| Type | Enum | Type of trunk which can be one of the following Analog ISDN IP |
| Board Address | String | Board to which the trunk is connected to |

The tasks associated with trunks include the following:

| Task | Description |
|------|-------------|
| Add a trunk | Used to create a new trunk and the following needs to be specified<br>Name<br>Board connected to<br>Channel number<br>Type (Analog, ISDN, IP etc)<br>Direction — Specifies what types of calls are allowed (Inbound, Outbound or both) |
| Remove a Trunk | Delete an existing trunk |
| Edit a Trunk | Edit Properties of existing trunk |

Trunk Groups are logical components that are used to group a number of trunks together. A selection method can be defined that determines which trunk will be selected from the group. Trunk Groups are logical elements and, therefore, a class is defined from the CIM class Logical-Element and its attributes are as follows:

| Class | | Telephony-TrunkGroup |
|-------|--|----------------------|
| Type | | Structural Class |
| Subclass of | | Logical-Element |
| Auxiliary Classes | | |
| Attribute | Type | Description |
| Name | String | The name of the trunk group as it appears in the system. This name must be unique. |
| Trunks (+n instances) | ID | Each trunk group will contain multiple trunks. Each trunk will be configured in the following trunk configuration section. This field will contain a list of previously configured trunks that are contained by this trunk group. |
| Glare Disposition | String | Defines the action to be taken when glare occurs. |
| Direction | String | Defines the trunk direction. (In, Out, 2-Way) |
| Selection Method | String | The method utilized by the trunk group to select a trunk for the next outbound call. In other words, when a route guide asks a trunk group for a trunk, this method is used to determine which trunk should be use. It could select the next available trunk starting at the first trunk or last trunk, etc. This is highly dependent on the implementation of the trunk group. |
| Default Caller ID | String | Defines the display text for an outside caller if the call ID is blocked or unavailable. |

The tasks associated with a Trunk Group are as follows:

| Task | Description |
|------|-------------|
| List | The administration interface should have the ability to obtain a list of all trunk groups in the system. Once a trunk group is selected, any of the tasks below may be performed. |
| Query | The administration interface should be able to obtain the values for any and all attributes of a given trunk group. |
| Add | The Administration Application will have the ability to add new trunk groups to the system. When adding a new trunk group, the Administration Application will be able to set any and all of the configuration parameters defined in the previous section. Any new trunk group that is added to the system will be useable immediately without requiring a restart. |
| Delete | The Administration Application will have the ability to remove or delete a trunk group from the system. Before removing the trunk group from the system, the Administration Framework must ensure that no trunk resources are currently utilizing the trunk group. |
| Modify Attributes | The Administration Application will have the ability to modify or update any or all of the trunk group configuration parameters in the previous section. This modification should take place in real time, without requiring a restart.<br>Attributes to be modified are:<br>ID<br>Name<br>Glare Disposition<br>Direction<br>Selection Method<br>Default Caller ID |
| Add Trunks | Each Trunk Group contains a list of Trunks that are contained in the group. The Administrator will be able to Add trunks to the Trunk Group at any time. |
| Delete Trunks | Each Trunk Group contains a list of Trunks that are contained in the group. The Administrator will be able to Delete trunks from the Trunk Group at any time. When deleting trunks from a trunk group, the Admin Framework must ensure that the trunk being deleted is not in use. |

Route guides are a logical link between a dialing sequence and a trunk group, and is highly dependent on the call control system. The general idea is that a dialed number can be prefixed by a digit or sequence of digits. This digit(s) will be a signal to the call control mechanism to use a particular route guide and in turn use a trunk in the associated trunk group to originate the outbound call. Route guides are only utilized for outbound initiated calls. Routing Rules are logical elements and, therefore, a class is derived from the CIM class Logical-Element and its attributes include the following:

| Class | Telephony-RoutingRule |
|---|---|
| Type | Structural Class |
| Subclass of | Logical-Element |
| Auxiliary Classes | |

| Attribute | Type | Description |
|---|---|---|
| Name | String | The name of the route guide as it appears in the system. This name must be unique. |
| Queue | Integer | Requests allocation of the next available trunk from specified trunk group. |
| Priority | Integer | Defines the priority for the Queue step |
| Wait | Integer | Used to suspend RGP |
| Play | String | Provide the ability to prompt or inform callers on the progress of off-premise call origination. |
| Busy | E.164 | Provides the capability to redirect an off-premise call origination attempt to another destination. |
| Exit | E.164 | To explicitly terminate RGP. |
| Dial Pattern (+n instances) | ID | Dial patterns that have registered with this route guide. |

The tasks associated with a Route Guide are as follows:

| Task | Description |
|---|---|
| List | The administration interface should have the ability to obtain a list of all route guides in the system. Once a route guide is selected, any of the tasks below may be performed. |
| Query | The administration interface should be able to obtain the values for any and all attributes of a given route guide. |
| Add | The Administration Application will have the ability to add new route guides to the system. When adding a new route guide, the Administration Application will be able to set any and all of the configuration parameters defined in the previous section. Any new route guide that is added to the system will be useable immediately without requiring a restart. |
| Delete | The Administration Application will have the ability to remove or delete a route guide from the system. Before removing the route guide from the system, the Administration Framework must ensure that no resources are currently utilizing the route guide. |
| Modify Attributes | The Administration Application will have the ability to modify or update any or all of the route guide configuration parameters in the previous section. This modification should take place in real time, without requiring a restart. Attributes to be modified are:<br>ID<br>Name<br>Queue<br>Priority<br>Wait<br>Play<br>Busy<br>Exit |
| Add Dial Patterns | Route guides have dial patterns that when matched in the dial plan will route the call through them. New dial patterns can be added at any time. |
| Delete Dial Patterns | Route guides have dial patterns that when matched in the dial plan will route the call through them. Each dial pattern can be deleted at any time. |

Cards are telephony resource boards that have been installed into the platform. For every board or card added to the platform, a new logical card must be created in the administration tool. Each logical card contains the following configurable parameters:

| Attribute | Type | Description |
|---|---|---|
| Name | String | The name of the card as it appears in the system. This name must be unique. |
| Physical Location | String | This field will contain a description of where the card is physically located. This description will be used for reference purposes only. This entry will not affect the operation of the platform. |
| Vendor Plug in ID | Integer | Path to the vendor plug-in for advanced config. |

The tasks associated with a Card include:

| Task | Description |
|---|---|
| List | The administration interface should have the ability to obtain a list of all cards in the system. Once a card is selected, any of the tasks below may be performed. |
| Query | The administration interface should be able to obtain the values for any and all attributes of a given card. |
| Start | The Administration Application will have the ability to start a card remotely. Once started, the card state will become Active. |
| Stop | The Administration Application will have the ability to stop a card remotely. A card can only be stopped once it has been started. Once stopped, the card state will become Idle. |
| Maintenance Out of Service (MOS) | The Administration Application will have the ability to take out of service (MOS) or pause a card remotely. MOSing a card will basically render the card inoperable, but accessible from the Administration Application. A card can only be MOSed once it has been started and is in an Active state. Once out of service, the card state will become MOS. |
| Maintenance In Service (MIS) | The Administration Application will have the ability to put in service (MIS) or resume a card remotely. MISing a card will return the card to an operable state. A card can only be MISed once it has been MOSed. Once in service, the card state will become Active. |
| Add | The Administration Application will have the ability to add new cards to the system. When adding a new card, the Administration Application will be able to set any and all of the configuration parameters defined in the previous section. Any new card that is added to the system will be useable immediately without requiring a restart. |
| Delete | The Administration Application will have the ability to remove or delete a card from the system. Before removing the card from the system, the Administration Framework must ensure that no card resources are currently being utilized or configured for use by any card subcomponents. |
| Modify Attributes | The Administration Application will have the ability to modify or update any or all of the card configuration parameters in the previous section. This modification can be done while the card is in any of the states mentioned above (Active, Idle, or MOS). If the card is currently Active or MOS, the changes to the configuration should take place in real time, without requiring a restart. Attributes to be modified are<br>ID<br>Name<br>Physical Location<br>Vendor Plug-in ID |
| Reset | The Administration Application will have the ability to reset a card remotely. Resetting a card will basically return the card to its original state of operation as if it had just been started. The card will be in an Active state on the completion of a reset. |
| Monitor | The Administration Application will have the ability to monitor various types of data for each card. The data monitored may be operational data used by support personnel for trouble shooting the system or general statistical information for the card. |

Prefix/Suffix digits (PSD) are digits that are added to the dial string. PSD Attributes include the following:

| Attribute | Type | Description |
| --- | --- | --- |
| ID | Integer | The PSD ID is the identification of the PSD as it appears in the node. This identification must be unique in the node. |
| Name | String | The name of this PSD in the system |
| Prefix/Suffix | String | Defines whether to add the digits to the beginning or the end of the dialed digits. |
| Digits | String | The actual digit string to add to the dialed number |
| Significant Digits to Send | Integer | The number of dialed digits to keep and outpulse with the prefix/suffix digits. |

The tasks associated with a PSD include:

| Task | Description |
| --- | --- |
| List | The Administration Application will have the ability to list all PSDs currently configured in the system. |
| Query | The Administration Application will have the ability to query the system for configuration information for each PSD in the list of configured PSDs. |
| Add | The Administration Application will have the ability to add new PSDs to the system. When adding a new PSD, the Administration Application will be able to set any and all of the configuration parameters defined in the previous section. Any new PSD that is added to the system will be useable immediately without requiring a restart. |
| Delete | The Administration Application will have the ability to remove or delete a PSD from the system. Before removing the PSD from the system, the Administration Framework must ensure that no other components are dependent on the PSD being removed. |
| Modify | The Administration Application will have the ability to modify or update any or all of the PSD configuration parameters in the previous section. This modification should take place in real time, without requiring a restart. |

Call Logging includes the following tasks:

| Task | Description |
| --- | --- |
| Enable Call Logging | Used to enable call logging and can be selectively enabled for one or more of the following<br>Inbound calls<br>Outbound calls<br>Internal Calls<br>Etc |
| Disable Call Logging | Used to disable call logging |
| Configure CDR | Used to specify various parameters for CDRs and includes<br>Maximum CDR records in a file<br>Minimum CDR records<br>Name of CDR file |
| View CDR | Used to view Call data records based on various filters |
| Print CDR | Used to print CDRs based on some filters |
| Search CDR | Used for searching CDR based on some fields |

RAS Server includes the following tasks:

| Task | Description |
| --- | --- |
| Configure Ports | Ports can be configured for<br>Inbound only<br>Inbound and Outbound<br>(for demand-dial outing) |
| Set phone number on ports | Used to set a phone number for the port |
| Configure a direct serial connection | Used to add modems |
| Configure a X.25 smart card | Used to add X.25 cards |
| Configure Authentication Provider | Used to specify authentication and can be one of the following<br>Windows Authentication<br>RADIUS Authentication |
| Configure Accounting Provider | Used to specify authentication and can be one of the following<br>Windows Accounting<br>RADIUS Accounting |
| Configure Authentication Protocol | Used to configure authentication protocols and can any of the following<br>EAP<br>EAP-RADIUS |
| Enable/disable RAS Logging | Used to enable/disable RAS logging |
| Create a static IP address pool | Used for creating a static IP address pool for remote clients |
| Configure PPP | Used to configure various properties of PPP like enabling Multilink connections, specifying Dynamic Bandwidth Control protocols etc. |

The Router includes the following tasks:

| Task | Description |
| --- | --- |
| Add a Routing Interface | Used to add a new routing interface and can be one of the following<br>LAN interface<br>Demand-dial Interface<br>IP-in-IP tunnel interface |
| Remove a Routing Interface | Used to remove an existing Routing Interface |
| Configure a Demand-dial filter | Used to specify what type of traffic can create demand-dial connections |
| Configure a Packet Filter | Used to filter IP packets |
| Configure a PPTP Filter | Used to specify what type of traffic can make PPTP connections |
| Configure a local host filter | Used to specifying filtering at the host level |
| Add a Port | Used to add a port and can be one of the following types<br>PPTP<br>L2TP<br>Maximum number of ports has to be specified (up to 1000 allowed) |
| Enable routing on a port | Used to enable routing on a routing port |
| Add a IP routing protocol | Used to add a new routing protocol |
| Remove a IP routing protocol | Used to delete an existing routing protocol |
| Change Preference level | Used to set preference levels for the various routing protocols |
| Configure a Static Route | Used to specify a Static route and the following is needed<br>Routing Interface<br>Destination<br>Network Mask<br>Gateway<br>Metric |
| Enable/disable Authentication for RIP | Used to enable/disable authentication when RIP is used between routers |
| Enable/disable auto-static update mode for RIP | Used to enable/disable auto-static update mode for a particular Routing interface when using RIP |
| Configure Route Filter for RIP | Used to specify a route filter for a particular routing interface when |

-continued

| Task | Description |
|---|---|
| | using RIP and can be specified for incoming or outgoing routes. |
| Configure Peer Filter for RIP | Used to specify a filter for a particular peer router. |
| Configure a Unicast neighbor for RIP | Used to specify a unicast neighbor |
| Enable/disable Silent RIP | Used to enable/disable Silent RIP. Enabling Silent RIP stops the router from making RIP announcements but will process RIP announcements from other routers. |
| Create an OSPF area | Used to create an OSPF (Open Shortest Path First) Area |
| Configure ranges for an OSPF area | Used to specify ranges for an OSPF area and the following is needed Range of IP addresses Network mask |
| Configure an ASBR | Used to configure a Autonomous System Boundary Router |
| Add a virtual interface | Used to create a virtual interface and the following is needed Neighbor route ID Transit delay Re-transmit delay Hello Interval Dead interval |
| Configure NAT (Network Address Translation) | Used to configure NAT protocol |
| Configure DHCP relay agent | Used to configure a DHCP relay agent when there are multiple IP networks |

For DHCP Server related classes, the classes and attributes defined in the DEN schema are used. There are a number of classes that are used to model the various components related to the DHCP server, including:

| Class | DHCP-Top |
|---|---|
| Type | Structural Class |
| Subclass of | Top |
| Auxiliary Classes | |

| Task | Description |
|---|---|
| Create a Scope | Used to create a new scope and the following can be specified as part of the scope A range of IP addresses that can be distributed to clients A range of IP addresses that should be excluded A unique subnet mask to identify the scope A time interval for the lease period Reserve addresses for specific clients |
| Activate a scope | Used to activate an existing scope |
| Edit a Scope | Used to reconfigure an existing scope |
| Remove a Scope | Used to delete an existing scope. Note: A scope has to be deactivated before being removed. |
| Deactivate a Scope | Used to deactivate an existing scope |
| Create a Superscope | Used to create a new superscope. One or more scopes can be made as part of this superscope. Note: there has to be at least one scope created before creating a superscope |
| Edit a Superscope | Used to reconfigure an existing Superscope |
| Remove a Superscope | Used to delete an existing Superscope. |
| Deactivate a Superscope | Used to deactivate an existing Superscope |

-continued

| Task | Description |
|---|---|
| Create a Multiscope | Used to create a Multiscope to define a range of Class D IP addresses used for IP multicasting. |
| Edit a Multiscope | Used to reconfigure an existing Multiscope |
| Remove a Multiscope | Used to delete an existing Multiscope. |
| Deactivate a Multiscope | Used to deactivate an existing Multiscope |
| Create a Vendor or User Defined Options Class | Used to create a Options Class |
| Create a Default Option Type | Used to create a new Default Option Type |
| Remove a Default Option Type | Used to delete an existing Default Option Type |
| Edit a Default Option Type | Used to reconfigure an existing Default Option Type |
| Assign an Option | Used to assign an option and can be one of the following types Default options Server Options Scope Options Class Options Reserved Client Options |
| Delete a client's lease | Used to delete an existing client's lease of an IP address |
| View client's lease information | Used to view information about the client's current lease |
| Enable/disable Address Conflict Detection | Used to enable/disable Address conflict. When enabled, the server sends out "ping" requests out to the network to find out if there are clients with this IP address. |
| Enable/disable DHCP logging | Used to enable/disable DHCP server logging |

The DNS Server includes the following tasks:

| Task | Description |
|---|---|
| Add a Zone | Used to create new zones and can be one of the following Forward lookup zone Reverse lookup zone |
| Remove a Zone | Used to delete existing zones |
| Pause a Zone | Used to pause a zone |
| Start a Zone | Zones are started by default when they are created. This is used to start a paused zone. |
| Optimize Server | This can be used to optimize server by one or more of the following Enable Fast transfer format for zone transfers Prevent loading of zone when bad data is found Disable round-robin rotation for multihomed names Disable local subnet prioritization for multihomed names |
| Create zone delegation | Used to create a zone delegation to manage subdomains |
| Configure secondary DNS server | Used to configure secondary server for a zone. This can be used when the primary server is unavailable. |
| Enable/disable zone Update notifications | Used to enable/disable notifications to secondary servers of zone changes |
| Configure Zone Update Policies | Used to specify zone update policies and includes the following Allow Dynamic DNS Updates Allow only secure DNS updates Adjust Refresh interval (determines time intervals between zone secondaries updates with primaries) Adjust Retry interval Expire interval (how long zone info can be used before it needs to be refreshed) |

| Task | Description |
| --- | --- |
| Add a Resource Record | Used to create a new resource record and can be one of the following types<br>Host Record<br>Mail Exchanger Record<br>Alias Record<br>Pointer Record<br>Domain |
| Modify a Resource Record | Used to modify an existing record |
| Remove a Resource Record | |
| Restrict DNS to listen to only selected addresses | Used to specify a set of addresses that the DNS server should provide name service for |
| Change Boot method | By default, DNS server boots from the registry info, but can be made to boot from a file |
| Specify Name checking method | The name checking method can be one of the following<br>Strict RFC<br>Non RFC<br>Multibyte |

The Proxy Server includes the following tasks:

| Task | Description |
| --- | --- |
| Select Client Authentication Method | Select one of the 3 client Authentication methods<br>Anonymous<br>Basic<br>Windows NT Challenge/Response |
| Add a Proxy Filter | Used to create a new filter and filtering can be done based on<br>A single computer (IP address of computer needed)<br>A group of computers (IP address with subnet mask needed)<br>Domain (Domain name needed) |
| Remove a Proxy Filter | Removes an existing Proxy Filter |
| Edit a Proxy Filter | Change properties of an existing Proxy Filter |
| Enable/Disable Filtering | Enables/Disables filtering of Internet access based on installed filters |
| Enable/Disable Caching | Enables/Disables caching of data on the proxy server |
| Set Cache Expiration Policy | The cache expiration policy determines the TTL (time to live) for the objects in the cache<br>Fewest Internet Requests - this option will maximize TTL of cache objects and minimize Internet traffic.<br>Always Request Updates - This option will minimize TTL of cache objects but increase internet traffic |
| Enable/Disable Active Caching | Enables/Disables Active Caching. If enabled, the caching manager updates cache objects without client prompting. |
| Set Active Caching Policy | This is allowed only if active Caching is enabled. It can be set to<br>Most client cache hits - to update cache frequently<br>Fewest Internet Requests - to minimize frequency of automatic cache updates |
| Set Maximum Size of Cache object | This determines the maximum size of a cache object. By default, there is no size limitation. |
| Set Expired Cache Objects Policy | This can be set to<br>Return expired cache objects when site is unavailable<br>Do not return expired cache objects |
| Add a Cache Filter | Cache filters can be set up to determine data from which URLs are cached or not. To set a filter, the following is needed |
| | URL - the URL for this filter. Wildcards can be given. For e.g. *.domainname.com specifies all URLs under domainname.com<br>Always cache - to enable caching of objects for a subtree of the URL being filtered for<br>Never cache - the default option |
| Remove a cache filter | Removes an existing cache filter |
| Set Maximum Cache Size | Sets the maximum disk space used for caching. This can be set on a per-drive basis |
| Enable/Disable Proxy Server Logging | Enables/Disables logging and can be set to the following options<br>Regular Logging<br>Verbose Logging |
| Automatically Open New Log | This option will enable opening a new log file automatically and can be set to<br>Daily<br>Weekly<br>Monthly<br>When Maximum file size reached (size has to be specified) |

Now that we have examined the architecture of the framework and the various managed components, it would be useful to take a look at a simple component to manage and see how the various components are implemented in this exemplary embodiment of the system of the instant invention. In the following example the System Time on the exemplary enterprise telephony server will be managed. A user is able to Set and Get the System Time from the management console. The system will implement a Resource Provider that will provide methods that will implement this functionality. For the User Interface, the system will implement ASP scripts that will provide a Web UI and use the Resource Provider methods described above to achieve the functionality. The ASP scripts for English and German Languages will be localized and the code required to achieve dynamic localization based on the language setting on the browser will be implemented. The default language will be may be set, and is preferably English.

First step in this example is to design the class that represents this resource. This Resource will provide two methods, to Set and Get the System Time. The Set Method takes a string as an input parameter. This will contain the time to be set to in the hh:mm:ss format. The return value is an integer that will return success or an error code depending on whether the operation succeeded or not. The Get Method has a string as the output parameter. This will contain the current time in the hh:mm:ss format. The return value again, is an integer that will return success or an error code depending on whether the operation succeeded or not.

The class definition is placed in a MOF file that will contain the Namespace to which the class belongs, the definition of the class, and the methods it contains. This file contains another important piece of information and that is the name and GUID of the provider that implements these methods. This GUID is the GUID of the COM server that implements the provider. This is how WMI knows which server to load when it needs to execute a method associated with VA_SetTime class. This will be a registered COM server that WMI loads when a client requests any of the methods in the class to be executed. The MOF file can be either manually created or using WMI CIM Studio that is part of WMI SDK. After the MOF file is created, it's compiled using the MOF compiler. If it compiles without errors, then the class will be stored in the repository and will become part of the WMI schema.

The Resource Provider can be implemented in two ways. One way is to implement either an In Proc or Out of Proc COM Server and use the same GUID that was used to register the provider and register the COM server with Windows. The alternative method is to use the Provider Framework which is part of WMI SDK. Using this framework, a skeleton provider can be generated for any class. This contains boilerplate code that has all the COM registration code and also provides encapsulation of some WMI classes, thus freeing the developer of writing all the standard code for implementing a COM server. The actual implementation of the methods is the only thing that needs to be done.

Finally, the Web UI is developed. The Web UI components consist of ASP scripts. These scripts are localized for English and German, for example. The global.asa file has the code necessary to redirect the user to the correct ASP page depending on the language setting in the browser as discussed above.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A management model for managing at least resources and tasks in a computerized enterprise system, comprising:
   a user interface;
   a common information model object manager (CIMOM) exposing a first plurality of standard interfaces, said CIMOM in communication with said user interface through one of said first plurality of standard interfaces;
   at least one provider decoupled from said user interface and communicating with said CIMOM via another of said first plurality of standard interfaces, said provider exposing a second standard interface to allow management of the enterprise system resources and tasks at the provider level;
   wherein said second standard interface exposed by said provider includes command methods for getting and setting attribute values; and
   wherein said at least one provider performs syntax and semantic checks on inputs received from a user via said user interface and passed via said CIMOM.

2. The model of claim 1, wherein said user interface performs essentially no syntax and semantic checks of said inputs.

3. The model of claim 1, wherein said command methods for getting and setting attribute values are exposed for only particular attributes of said system resources and tasks based on privileges contained in a user profile.

4. The model of claim 1, wherein said second standard interface exposed by said provider includes a command method for getting help strings.

5. The model of claim 1, further comprising an active directory (AD) containing system resource information.

6. The model of claim 5, wherein system resource information includes at least one user profile.

7. The model of claim 1, wherein said second standard interface exposed by said provider includes command methods for saving and restoring configuration data.

8. The model of claim 1, wherein said user interface comprises a command line interface (CLI).

9. The model of claim 1, wherein said user inter face comprises a Web browser.

10. The model of claim 1, wherein said first plurality of standard interfaces exposed by said CIMOM are COM interfaces.

11. A management model for managing at least resources and tasks in a computerized enterprise system, comprising:
    a user interface;
    a common information model object manager (CIMOM) exposing a first plurality of standard interfaces, said CIMOM in communication with said user interface through one of said first plurality of standard interfaces;
    at least one provider decoupled from said user interface and communicating with said CIMOM via another of said first plurality of standard interfaces, said provider exposing a second standard interface to allow management of the enterprise system resources and tasks at the provider level;
    an active directory (AD) containing system resource information, wherein system resource information includes at least one user profile;
    wherein said second standard interface exposed by said provider includes a command method for getting help strings; and
    wherein said command method for getting help strings are exposed based on an expertise level contained in a user profile.

12. A management model for managing at least resources and tasks in a computerized enterprise system, comprising:
    a user interface comprising a Web browser;
    a common information model object manager (CIMOM) exposing a first plurality of standard interfaces, said CIMOM in communication with said user interface through one of said first plurality of standard interfaces;
    at least one provider decoupled from said user interface and communicating with said CIMOM via another of said first plurality of standard interfaces, said provider exposing a second standard interface to allow management of the enterprise system resources and tasks at the provider level;
    wherein said provider dynamically localizes a language of said user interface based on a sensed language preference of said Web browser.

13. The model of claim 12, wherein said provider dynamically localizes a language of said user interface based on settings in a user profile.

14. A computer-readable medium having computer-executable components, comprising:
    a user interface component for providing information to and receiving data and commands from a user;
    a common information model object manager (CIMOM) component for exposing a first plurality of standard interfaces, said CIMOM component communicating with said user interface through one of said first plurality of standard interfaces;
    at least one provider component for exposing a second standard interface to allow management of enterprise system resources and tasks at the provider level, said provider component communicating with said CIMOM via another of said first plurality of standard interfaces;
    wherein said second standard interface exposed by said provider component includes command methods for getting and setting attribute values; and
    wherein said at least one provider component performs syntax and semantic checks on inputs received from said user interface component via said CIMOM component.

15. The computer-readable medium of claim 14, further comprising a database component for storing at least a user profile, and wherein command methods for getting and setting attribute values are exposed for only particular attributes of said system resources and tasks based on privileges contained in said user profile.

16. The computer-readable medium of claim 14, wherein said second standard interface exposed by said provider includes a command method for getting help strings.

17. The computer-readable medium of claim 14, further comprising a directory component for storing system resource information.

18. The computer-readable medium of claim 14, wherein said second standard interface exposed by said provider component includes command methods for saving and restoring configuration data.

19. The computer-readable medium of claim 14, wherein said first plurality of standard interfaces exposed by said CIMOM are COM interfaces.

20. A computer-readable medium having computer-executable components, comprising:
   a user interface component for providing information to and receiving data and commands from a user;
   a common information model object manager (CIMOM) component for exposing a first plurality of standard interfaces, said CIMOM component communicating with said user interface through one of said first plurality of standard interfaces;
   at least one provider component for exposing a second standard interface to allow management of enterprise system resources and tasks at the provider level, said provider component communicating with said CIMOM via another of said first plurality of standard interfaces;
   a database component for storing at least a user profile;
   a directory component for storing system resource information, wherein system resource information includes at least one user profile;
   wherein said second standard interface exposed by said provider includes a command method for getting help strings; and
   wherein said command method for getting help strings are exposed based on an expertise level contained in said user profile.

21. A computer-readable medium having computer-executable components, comprising:
   a user interface component for providing information to and receiving data and commands from a user, wherein said user interface component comprises a Web browser component;
   a common information model object manager (CIMOM) component for exposing a first plurality of standard interfaces, said CIMOM component communicating with said user interface through one of said first plurality of standard interfaces;
   at least one provider component for exposing a second standard interface to allow management of enterprise system resources and tasks at the provider level, said provider component communicating with said CIMOM via another of said first plurality of standard interfaces;
   wherein said provider component dynamically localizes a language of said user interface component based on a sensed language preference of said Web browser.

22. A computer-readable medium having a computer-executable management system provider component including computer-executable instructions for performing the steps of:
   exposing a standard interface;
   receiving information via the standard interface relating to management of at least one of an enterprise resource and a task;
   performing syntax and semantic checks on the information;
   wherein said computer-executable management system provider component further includes computer-executable instructions for performing the step of getting help strings;
   wherein said computer-executable management system provider component further includes computer-executable instructions for performing the step of extracting user language preference information from an external component; and
   wherein said step of getting help strings includes the step of dynamically localizing the help strings based on the user language preference information.

23. A computer-readable medium having a computer-executable management system provider component including computer-executable instructions for performing the steps of:
   exposing a standard interface;
   receiving information via the standard interface relating to management of at least one of an enterprise resource and a task;
   performing syntax and semantic checks on the information;
   wherein said computer-executable management system provider component further includes computer-executable instructions for performing the step of getting help strings;
   wherein said computer-executable management system provider component further includes computer-executable instructions for performing the step of extracting user profile information from an external database; and
   wherein said step of getting help strings is exposed based on the user profile.

24. A method of exposing an element of an enterprise system to be managed, comprising the steps of:
   defining at least one user interface component to expose and allow access to the element on a user interface;
   implementing at least one provider for the element, said provider providing a class definition and generating instances of the class to which the element belongs, said provider further providing a standard interface to allow management of the element via the at least one user interface;
   wherein said user interface component is a Web user interface, and wherein the step of defining at least one user interface component to expose and allow access to the element on a user interface comprises the steps of:
   defining Web elements that add links to the managed elements in a Web UI framework; and
   implementing ASP scripts that implement the at least one provider; and
   wherein the step of implementing ASP scripts comprises the step of localizing a language of the ASP scripts based on a sensed language preference of said Web user interface.

* * * * *